(12) United States Patent
Wills

(10) Patent No.: US 9,020,416 B2
(45) Date of Patent: Apr. 28, 2015

(54) METHOD AND APPARTUS TO MEASURE SIZE OF TROPHY GAME

(71) Applicant: Dale E. Wills, Tequesta, FL (US)

(72) Inventor: Dale E. Wills, Tequesta, FL (US)

( * ) Notice: Subject to any disclaimer, the term of this patent is extended or adjusted under 35 U.S.C. 154(b) by 189 days.

(21) Appl. No.: 13/913,072

(22) Filed: Jun. 7, 2013

(65) Prior Publication Data
US 2013/0331146 A1 Dec. 12, 2013

Related U.S. Application Data

(60) Provisional application No. 61/657,300, filed on Jun. 8, 2012.

(51) Int. Cl.
H04H 40/00 (2008.01)
H04M 1/02 (2006.01)
G06Q 50/02 (2012.01)

(52) U.S. Cl.
CPC .............. *H04M 1/0264* (2013.01); *G06Q 50/02* (2013.01)

(58) Field of Classification Search
CPC .......... H04M 1/72552; H04M 1/0264; H04M 2215/2026; H04M 2215/32; H04M 2250/10; G06F 17/30247
USPC .......................... 455/3.06, 456.1, 457; 43/4, 8
See application file for complete search history.

(56) References Cited

U.S. PATENT DOCUMENTS

| 2,458,811 | A | 1/1949 | Koscielski |
| 4,307,456 | A | 12/1981 | Ise et al. |
| 5,027,526 | A | 7/1991 | Crane |
| 5,142,793 | A | 9/1992 | Crane |
| 5,148,411 | A | 9/1992 | Shalvi |
| 5,894,678 | A | 4/1999 | Masreliez et al. |
| 6,959,499 | B2 | 11/2005 | Bini |
| 7,408,125 | B2 | 8/2008 | Lentine |
| 7,605,332 | B2 | 10/2009 | Winkler |
| 8,141,262 | B1 | 3/2012 | Lee |
| 2002/0133965 | A1 | 9/2002 | Gilber |
| 2006/0095199 | A1* | 5/2006 | Lagassey ...................... 701/117 |
| 2007/0045010 | A1 | 3/2007 | Kasperek |
| 2007/0256314 | A1 | 11/2007 | Ruiz |
| 2009/0084020 | A1* | 4/2009 | Sorey ................................. 43/25 |
| 2010/0064539 | A1 | 3/2010 | Jacobs |
| 2011/0192046 | A1 | 8/2011 | Kinziger |
| 2011/0208479 | A1 | 8/2011 | Chaves |
| 2012/0144723 | A1* | 6/2012 | Davidson ........................ 43/17.6 |
| 2014/0012861 | A1* | 1/2014 | Bradsher ....................... 707/748 |

* cited by examiner

*Primary Examiner* — Tu X Nguyen
(74) *Attorney, Agent, or Firm* — McHale & Slavin, P.A.

(57) ABSTRACT

The instant invention is a ribbon for use with sport fishing in conjunction with a GPS-enabled smart-phone. The ribbon tape is calculated in terms of estimated weight allowing an ocean weigh-in, versus a dock located weigh-in, to meet the fishing tournament requirements and/or a recreational angler's requirements, and the GPS-enabled smart-phone allows accurate documentation of the catch for competition or recreational purposes. The ribbon tape of the instant invention provides an estimate of fish weights based upon fish length, the fish weights based upon a statistical averaging of a particular fish species. The objective of the invention is to eliminate the destruction of fish caught only for the purpose of determining fish size and weight, and to eliminate the risk caused by tournament fishing boats racing back to weigh-in stations.

19 Claims, 42 Drawing Sheets

A) 100 LBS / 70" - 86 1/4"  — 45.36 KGS
B) 200 LBS / 86 1/4" - 97 1/2"  — 90.72 KGS
C) 300 LBS / 97 1/2" - 106"  — 136.08 KGS
D) 400 LBS / 106" - 113 1/2"  — 181.44 KGS
E) 500 LBS / 113 1/2" - 120 1/2"  — 226.8 KGS
F) 600 LBS / 120 1/2" - 125 1/2"  — 272.16 KGS
G) 700 LBS / 125 1/2" - 130 1/2"  — 317.51 KGS
H) 800 LBS / 130 1/2" - 135"  — 362.87 KGS
I) 900 LBS / 135" - 139"  — 408.23 KGS
J) 1000 LBS / 139" - 150"  — 453.139 KGS

FIG. 3

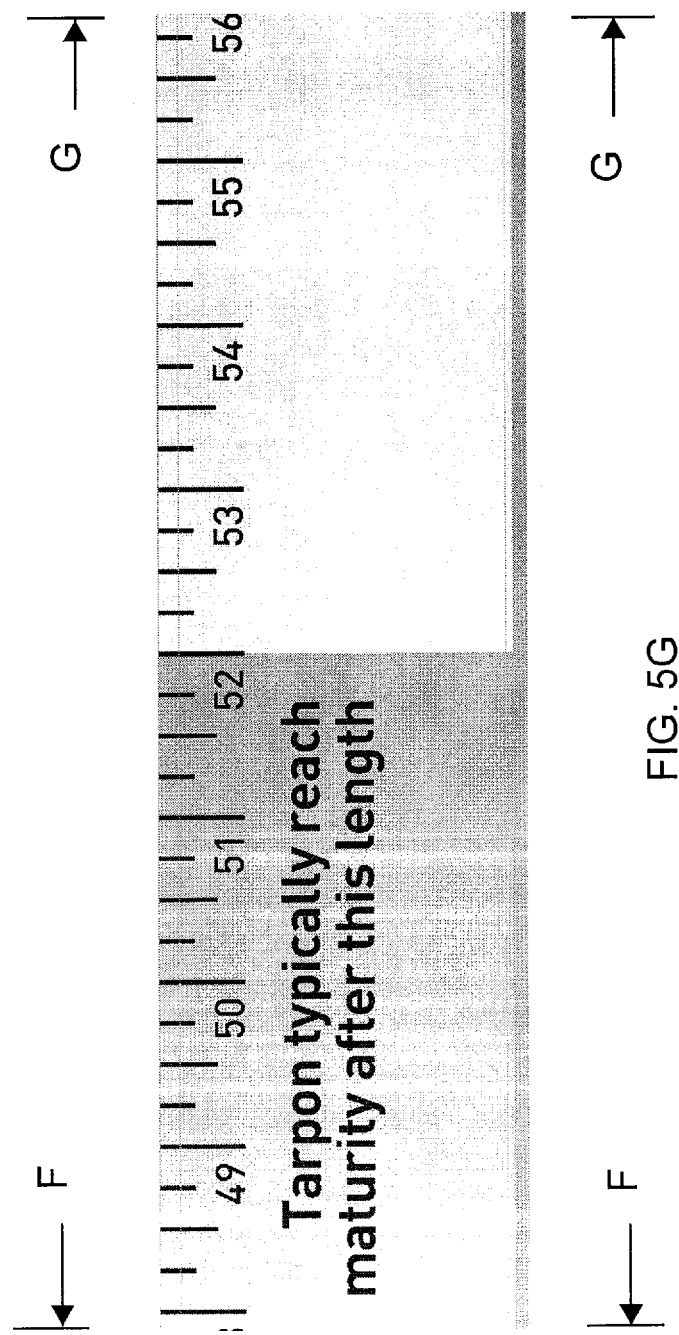

METHOD AND APPARTUS TO MEASURE SIZE OF TROPHY GAME

PRIORITY CLAIM

In accordance with 37 C.F.R. 1.76, a claim of priority is included in an Application Data Sheet filed concurrently herewith. Accordingly, the present invention claims priority under 35 U.S.C. §119(e), 120, 121, and/or 365(c) to U.S. Provisional Patent Application No. 61/657,300, entitled "FISH WEIGHT MEASURING TAPE", filed Jun. 8, 2012. The contents of which the above referenced application is incorporated herein by reference.

FIELD OF THE INVENTION

This invention is related to the field of fishing and hunting, and more particularly, to a method and apparatus to measure the size of trophy game.

BACKGROUND OF THE INVENTION

A fishing tournament is an organized competition among anglers. Fishing tournaments typically take place as a series of competitive events around or on a clearly defined body of water with specific rules applying to each tournament. Fishing tournaments have become a popular way to support charity, education, or the like just causes. As with any gaming competition, the participants compete for bragging rights as well as prizes. Typically, anglers compete for prizes based on the total weight of a given species of fish caught within a predetermined time, while other tournaments are based purely on length and have mandatory catch and release requirements. The sport has evolved from local fishing contests into large competitive circuits, especially in North America. As the tournaments grow and the anglers become more adept at targeting fish, the tournaments have become more selective as to the type of fish targeted. For instance, the KDW is popular fishing tournament format which targets kingfish, dolphin fish, and wahoo.

With the popularity of fishing tournaments and the fishing industry increasing, anglers are better equipped with faster boats having stronger fishing gear and equipped with the latest in advanced technologies that allow for tracking specific schools of species. These advancements have led to a strain on various species of fish, especially billfish. A marlin is a species of billfish holding the distinct position as one of the larger fish in the ocean. The largest females can reach up to feet and weigh upwards of 1,500 lbs. The marlin is easily recognizable because of its cobalt blue top and silvery white scales below, additionally a long lethal spear shaped upper jaw is most distinctive as it projects outward. The marlin is also known to be one of the fastest and strongest fish in the ocean, making it a targeted species to be caught in both tournaments and recreationally. Traditionally, tournament anglers, where it was a requirement, and recreational anglers brought a caught marlin in to shore to be weighed, which typically resulted in the death of the marlin during the transfer from the ocean to the pier. Once a marlin is weighed at a pier, the marlin is typically discarded as the eating of this particular fish requires an acquired taste. Thus there exists a need for a means to weigh-in a catch without harm to the fish.

Fishing tournaments are confined to a body of water or region in the ocean, participants pursue a common goal or target species, and the fishing tournament results are kept within the host community. The internet has started a new trend giving fishing tournaments a worldwide presence. The internet has allowed fishing tournaments to take place in multiple bodies of water spanning multiple areas within a country or multiple countries. Now anglers who live hundreds of miles apart can participate in the same fishing tournament, pursuing the same prize while fishing in different bodies of water.

Not only are new fishing tournaments being conducted online but now event officials are placing their fishing tournaments online, thus allowing participants to post their results online in real-time. Other tournaments based purely on fish length with mandatory catch and release, whereby either the longest fish or total length is documented with a camera and results are posted online immediately. These changes have lowered the fish kill in many tournaments as participants no longer have to kill their fish for weigh-in if they already know it won't be a top contender or where fish length is the standard a kill is no longer necessary.

Subsequently, the internet has increased fishing tournament participation among anglers as well as created very generous prizes due to more exposure and participation. As the tournament popularity increases and the demand for seafood in the food industry remains high, the fish can become more elusive. Advancements in the fishing industry have led to technologies that have made such obstacles easier to overcome, such as making the targeting of large fish more exact. Thus the potential for large fishing tournaments to impact the environment and fish stocks is substantial. For this reason, it is most beneficial that the fish caught during a tournament be measured and released, without causing trauma or death to the fish during its release. Recognizing the need for catch and release because of the impact on the environment and fish stock some fishing tournaments require video documentation of the catching and releasing of a fish along with the Global Positioning System, or GPS, verified time in an unbroken video in order to award points. It is therefore important to be able to accurately reflect the time and size of a fish caught.

Other fishing tournaments, specifically where competitors do not submit their catch results online, use fish weight or documentation of the catch and release as the means for awarding prizes. These fishing tournaments maintain rigid hours of competition and require boats to be at weigh-in stations before a given time if the fish caught, or documented, is to be counted for competition purposes. This time restriction helps the tournament maintain a boundary of fishing area. However, this has led to increasingly more powerful fishing boats capable of great speeds for the sole purpose of getting back to the weigh-in station from far away. A fast moving fishing boat racing back to a weigh-in station creates a dangerous situation, one that has at times led to crashes and lawsuits against both the boat owners and the fishing tournaments.

Thus what is lacking in the art is a system and method to upload an image or video of the catch and release, which includes a GPS time and location stamp, a means to measure the fish length, and predict the fish weight based upon the fish length; thereby imposing less trauma to the fish during catch and release, improving fish stock, eliminating the need for the angler to kill the fish by returning to a weigh-station for the sole purpose of size estimation, and preventing the need for unsafe racing back to the shore to submit evidence of the catch.

SUMMARY OF THE INVENTION

The instant invention is a floating ribbon that includes the function of a measuring tape to be used in combination with a GPS-enabled smart-phone for the purpose of documenting and determining the length and weight of a fish caught while at sea. The system includes a ribbon tape and a smart-phone having a GPS receiver electrically coupled to a GPS network, an electronically coupled camera, and a camera application running on a microprocessor, wherein the camera application is capable of documenting GPS Time or Coordinated Universal Time (UTC) and determining the weight of a fish according to its length based on a single frame image, captured with the ribbon tape placed alongside the fish.

Accordingly, it is a primary objective of the instant invention to provide a system having a camera application that presents a method to measure fish size and to predict the fish weight using an algorithm incorporating the fish length. In one embodiment, the length can be calculated by capturing an image of the ribbon tape placed alongside a fish to then determine a weight based off the measured length. Additionally, the system can accurately provide the time of the catch using the GPS time signal or Coordinated Universal Time (UTC) associated with that GPS-enabled smart-phone, as well as provide the global location of the catch based on the GPS signal.

It is a further objective of the instant invention to teach a concept of fish conservation and helping to maintain the fish population by reducing the needless destruction of fish that are otherwise caught solely for the purpose of weighing them, whether in a tournament or recreationally. For instance, some species of fish, such as a marlin can live upwards of 30 years, and if a marlin is measured only with the instant invention and then released, the marlin will have received no stress and it will be available for further tournaments as well as reproduction.

It is a still further objective of the instant invention to provide a means of accurately documenting the catch of a fish, the length, the weight, the time, and the location without having to pull the fish onto the boat or bring the fish into the pier for purposes of weigh-in. The result is that tournaments and recreational anglers would no longer have to kill the fish during weigh-in, thus preserving fish stock.

It is an additional objective of the instant invention to provide a system with the ability to estimate the weight of the fish directly from the ribbon tape. This allows the angler to estimate the weight of the fish without undue stress to the fish. The angler can photograph the fish with the ribbon tape alongside as proof and documentation of the catch before its release. This documentation can be used for taxidermy purposes as well, as anglers are well known for wanting to display their catch for trophy purposes.

It is yet another additional objective of the instant invention to provide a camera application that can either document the catch with a still image or, if the competition rules require it, with a continuous video of the catch and release with the accurate reflection of the time. The use of the system provides the further benefits of allowing an angler to document the time, location, length, and weight of a catch to a tournament official from a distance, thereby eliminating the need for a boat to race dangerously back to a weigh-in station before a time cut-off to submit the evidence of their catch.

It is yet another objective of the instant invention to provide a camera application that can show the image of the catch with the time, location, length, and weight data superimposed on top of the image for an accurate documentation of the catch which can then be sent to tournament officials for submission, or if the catch was recreational the image can capture the moment for personal records. A camera application that can also upload the image and/or video to a website where tournament officials, spectators, and even participants can follow the progress of all competitors.

It is yet another objective of the instant invention to provide a floating tape that allows for the weight estimate of fish, the floating ribbon tape may be used for any size fish and any species.

It is a further objective of the instant invention to provide a system and method of weighing and measuring a trophy animal whereby the system and method for measuring weight and size is not limited to a specific fish, but to other fish and trophy animals such as, but not limited to, deer, elk, moose, bear, muskellunge, wall-eye, bass, salmon, sturgeon, halibut, blue fin tuna, wahoo, dolphin fish, pelagic fish, kingfish, blue marlin, white marlin, sailfish, swordfish, mako shark, tarpon, snook redfish trout, trout, or the like.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE DRAWINGS

FIG. 3 is grouping of incremental sections from the ribbon tape;
FIGS. 5A, 5B, 5C, 5D, 5E, 5F, 5G, 5H, 5I, 5J, 5K, and 5L are side views of a tarpon ribbon tape.

DETAILED DESCRIPTION OF THE INVENTION

Figure 1:
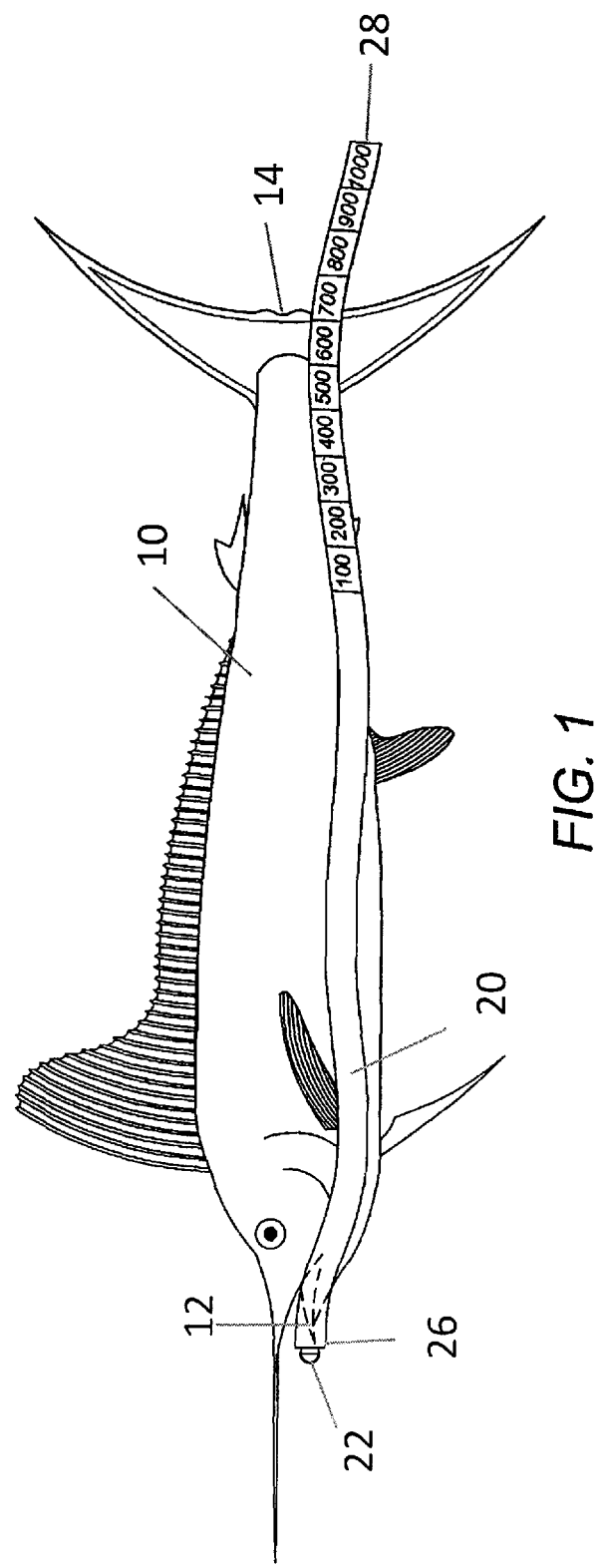
FIG. 1 is a pictorial view of a fish with a ribbon tape.

Now referring to FIG. 1, illustrated is a fish 10 wherein the ribbon tape 20 of the instant invention is shown with a frontal aperture 22, such as a D-ring or grommet, along a first end placed alongside a fish to measure the length and the second end 28 of the ribbon tape extending about 150 inches long and 3 inches wide. The extending of the tape is made possible by use of a material that has a friction bearing surface that allows the tape to extend along the length of the fish by the action of the water upon the tape as it is being pulled behind the boat. The ribbon tape 20 floats allowing it to easily unravel and in this illustration the length, the measurement from the front of the fish, or beak, 12 to the tail fork 14, would indicate that the weight of this fish is approximately 700 pounds. The length versus the weight of a species of fish has been calculated by statistical analysis of fish species wherein the length of a fish can be equated to their weight. In this manner the average size of fish can be equated to the length. With billfish, the length corresponds to the lower jaw fork length which measures from the lower jaw of the fish, excluding the bill, to the fork in the tail of the fish. With non-billfish, the length is measured from the beak to the fork in the tail. A tournament angler can simply lay out the ribbon tape by placing the loop alongside the fish to measure the length and take a photograph or video of the marlin alongside the boat. The ribbon tape drawn to the back of tail, specifically the tail fork, will provide an easily recognizable indication of the length and the estimated weight of the fish. The fish can then be released without further stress, eliminating the need to pull the fish into the boat and drive the fish back to shore for the sole purpose of weight measurement. It is not possible for a boat in moving seas to attempt to weigh a large fish through conventional hand skills as many fish caught in a tournament can exceed 500 pounds. While it is possible to catch a Marlin or other animal that reaches up to 1,500 pounds, that is not the norm and thus the length of the tape is drawn to 150 inches.

Figure 2:
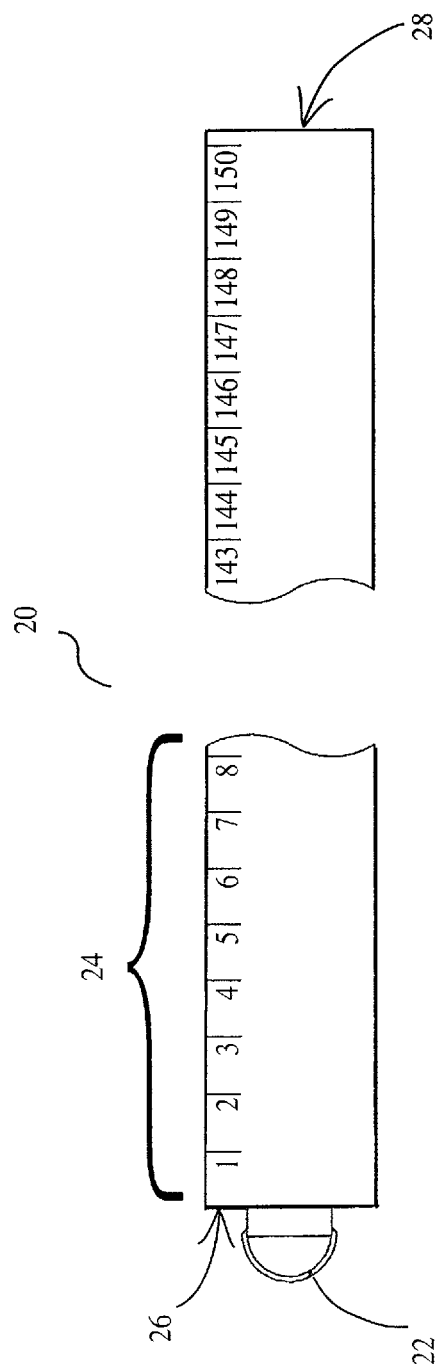
FIG. 2 is a side view of the ribbon tape.
Figure 4A:
FIGS. 4A, 4B, 4C, 4D, 4E, 4F, 4G, 4H, 4I, 4J, 4K, and 4L are side views of a white marlin ribbon tape.
Figure 4B:
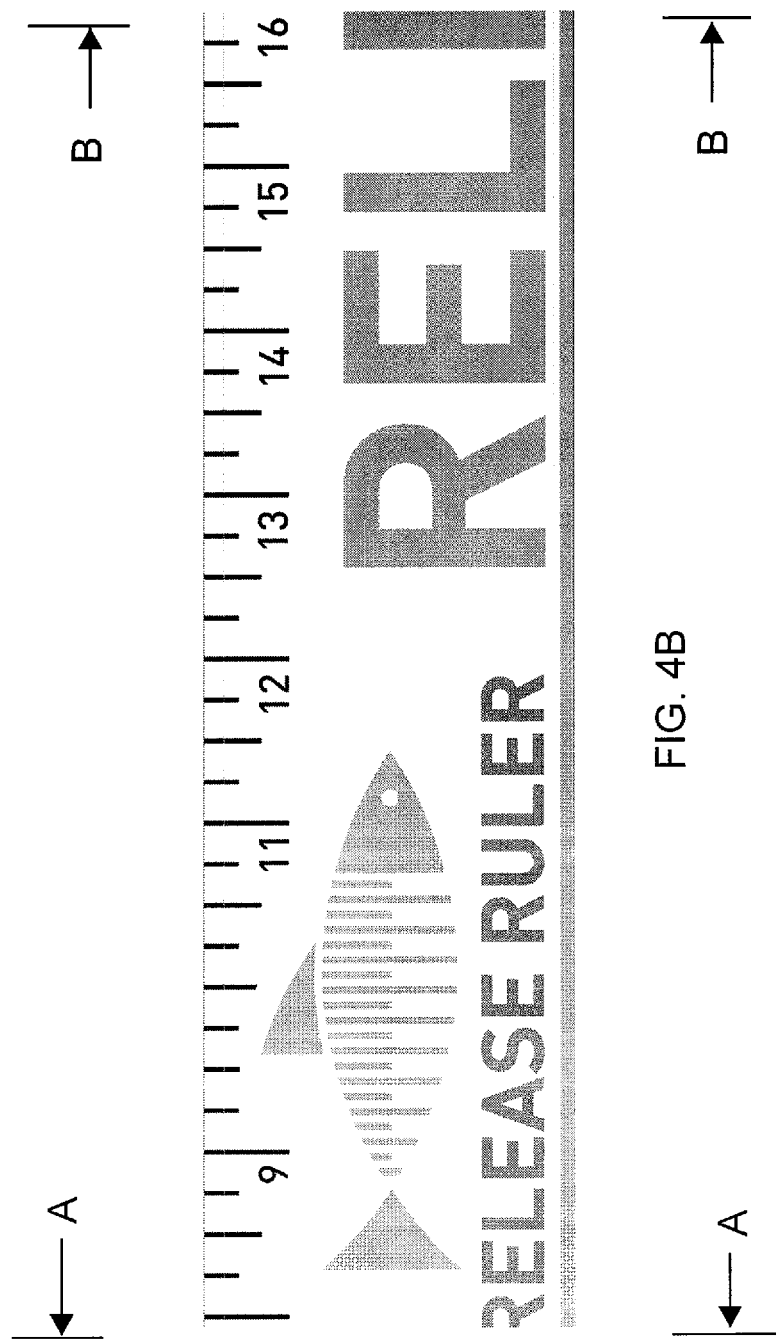
Figure 4C:
Figure 4D:
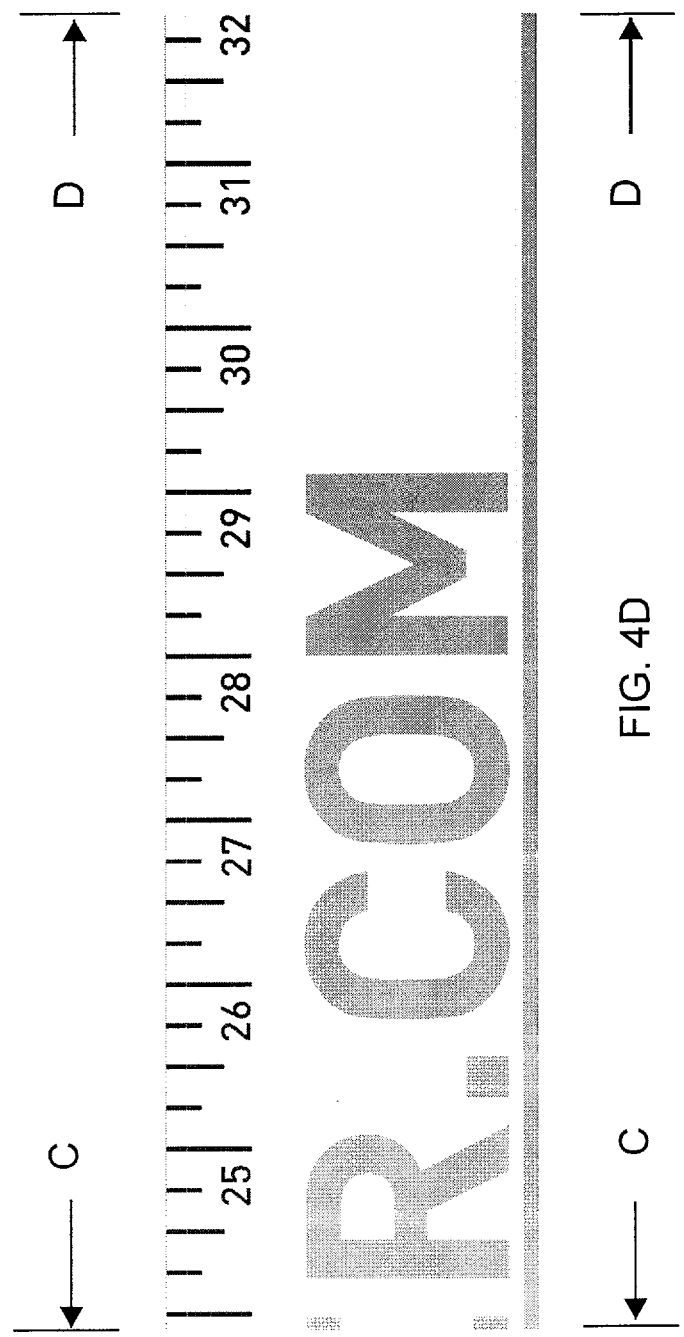
Figure 4E:
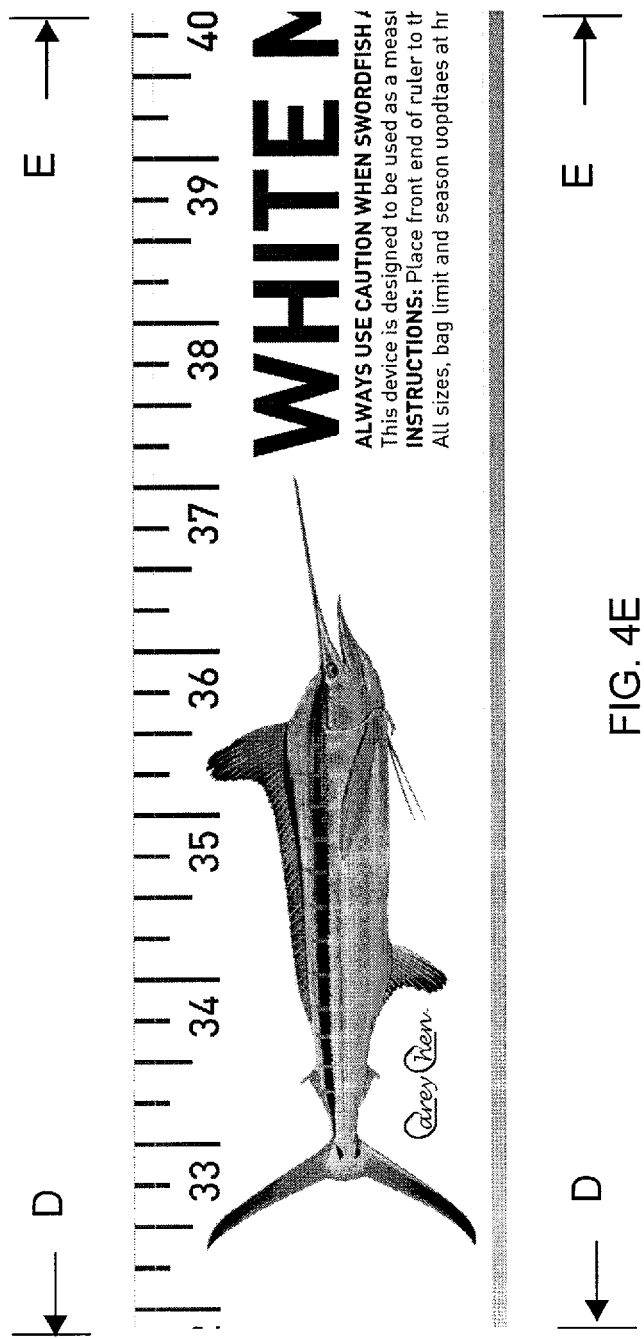
Figure 4F:
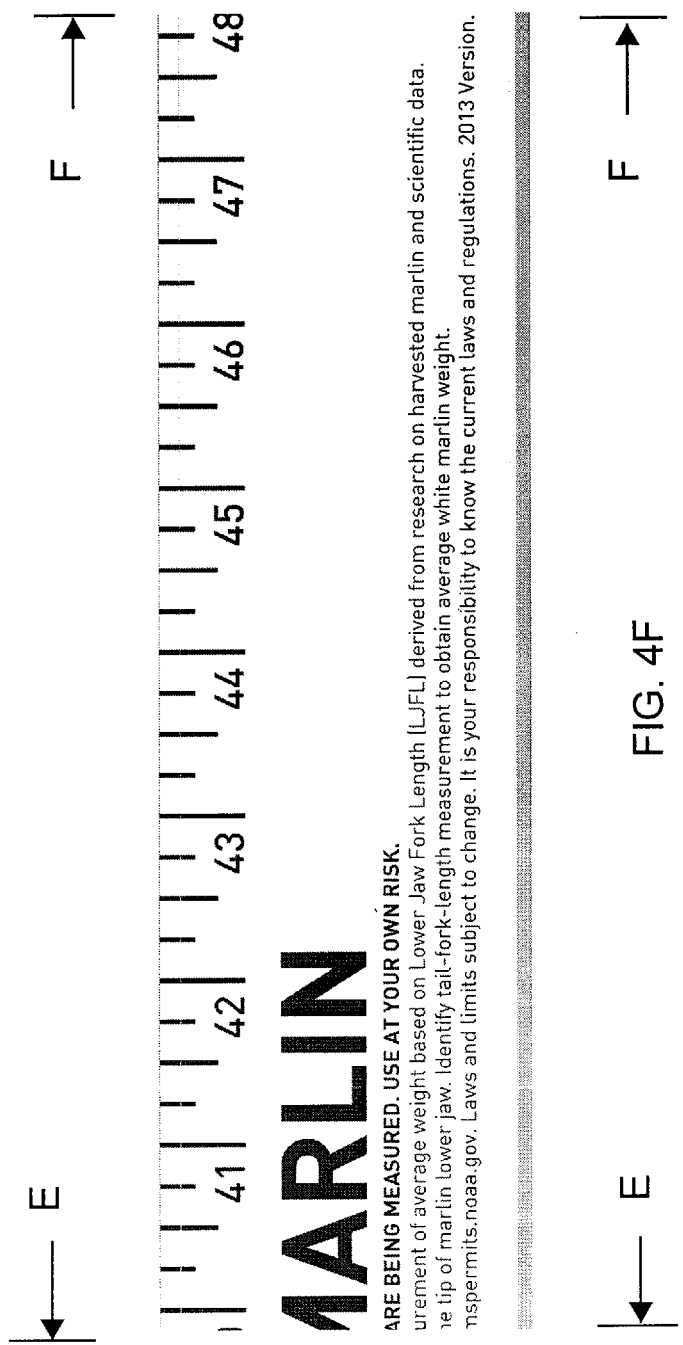
Figure 4G:
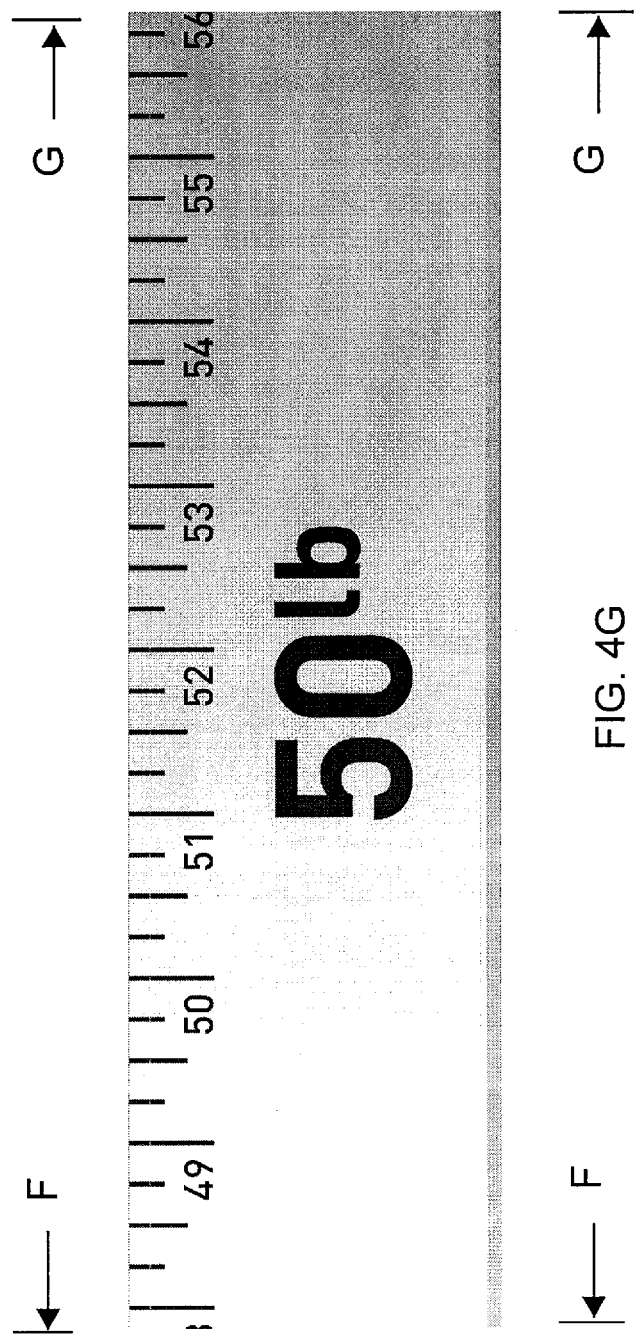
Figure 4H:
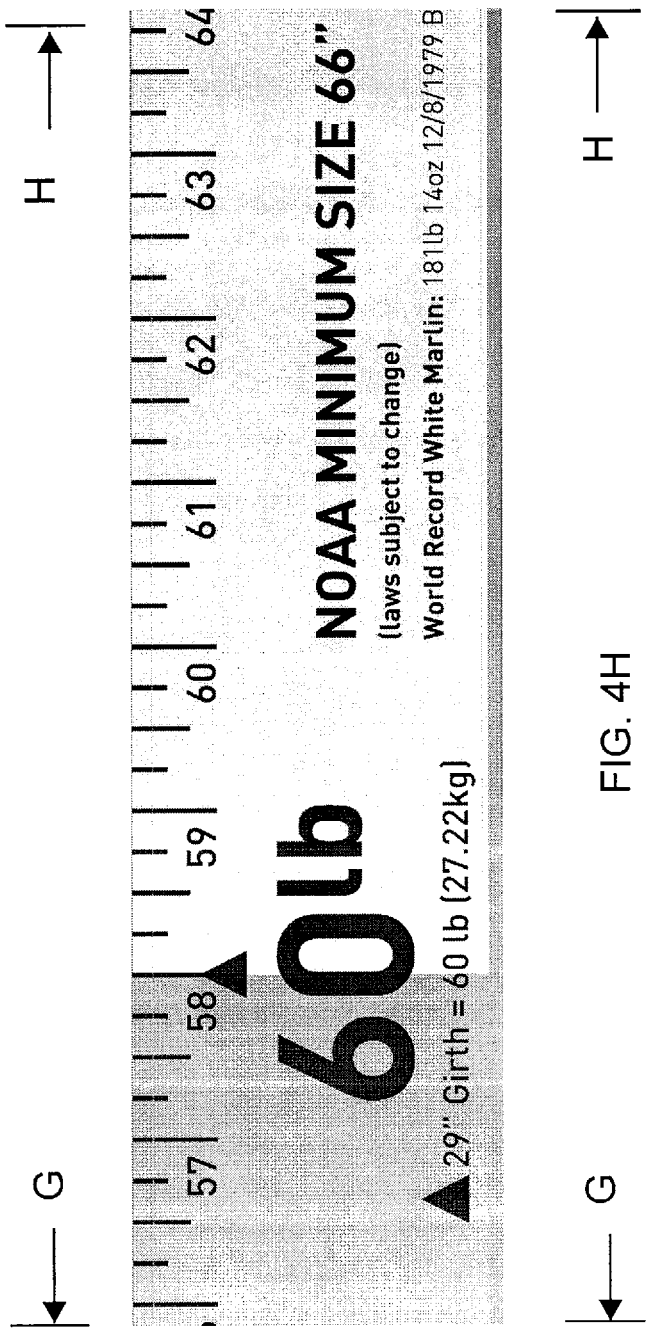
Figure 4I:
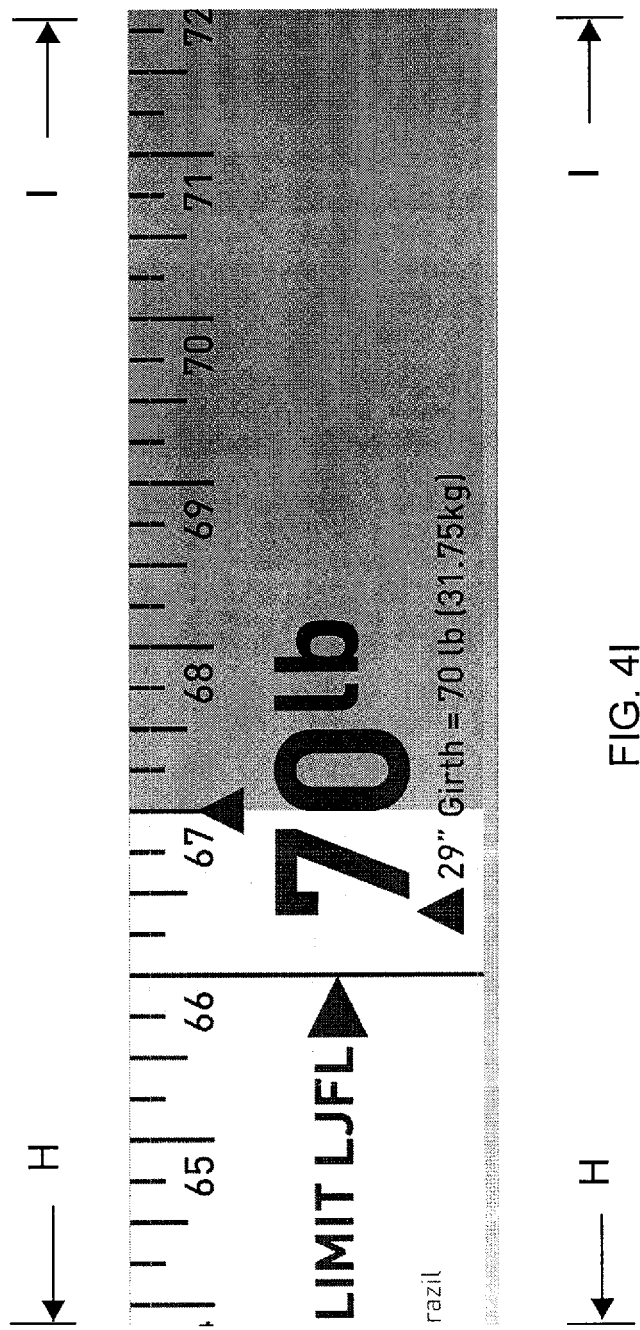
Figure 4J:
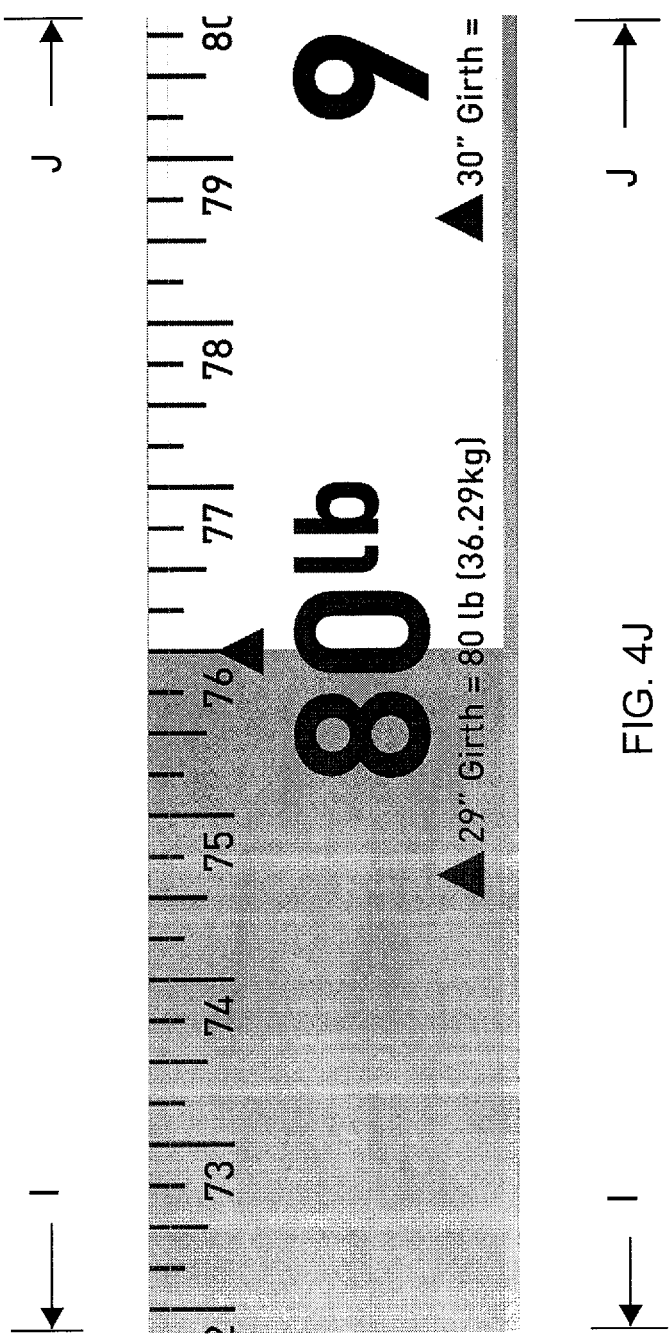
Figure 4K:
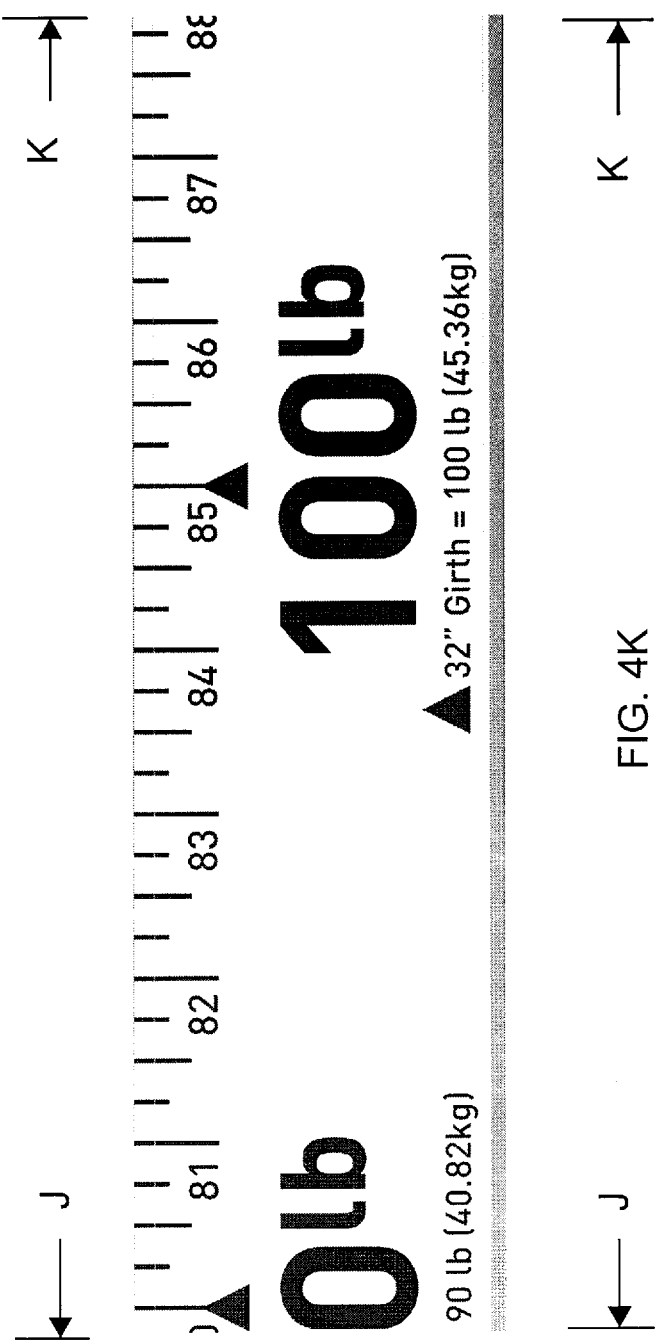
Figure 4L:
Figure 5A:
Figure 5B:
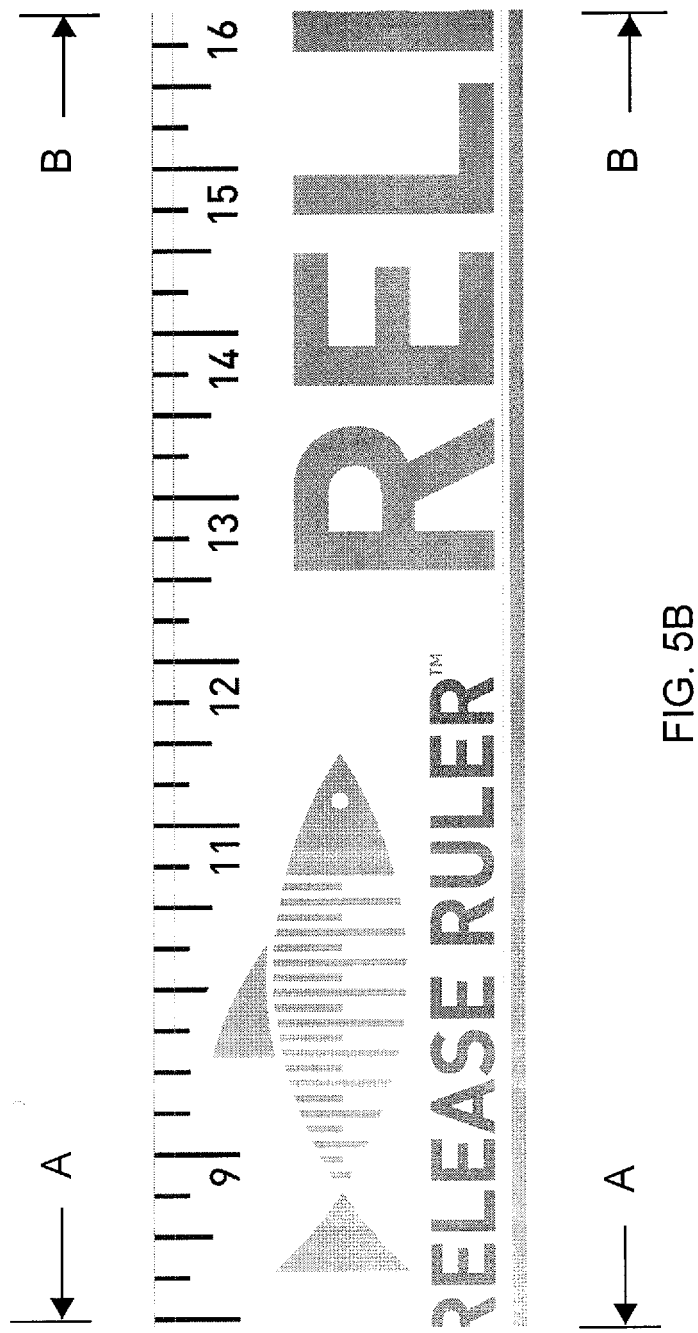
Figure 5C:
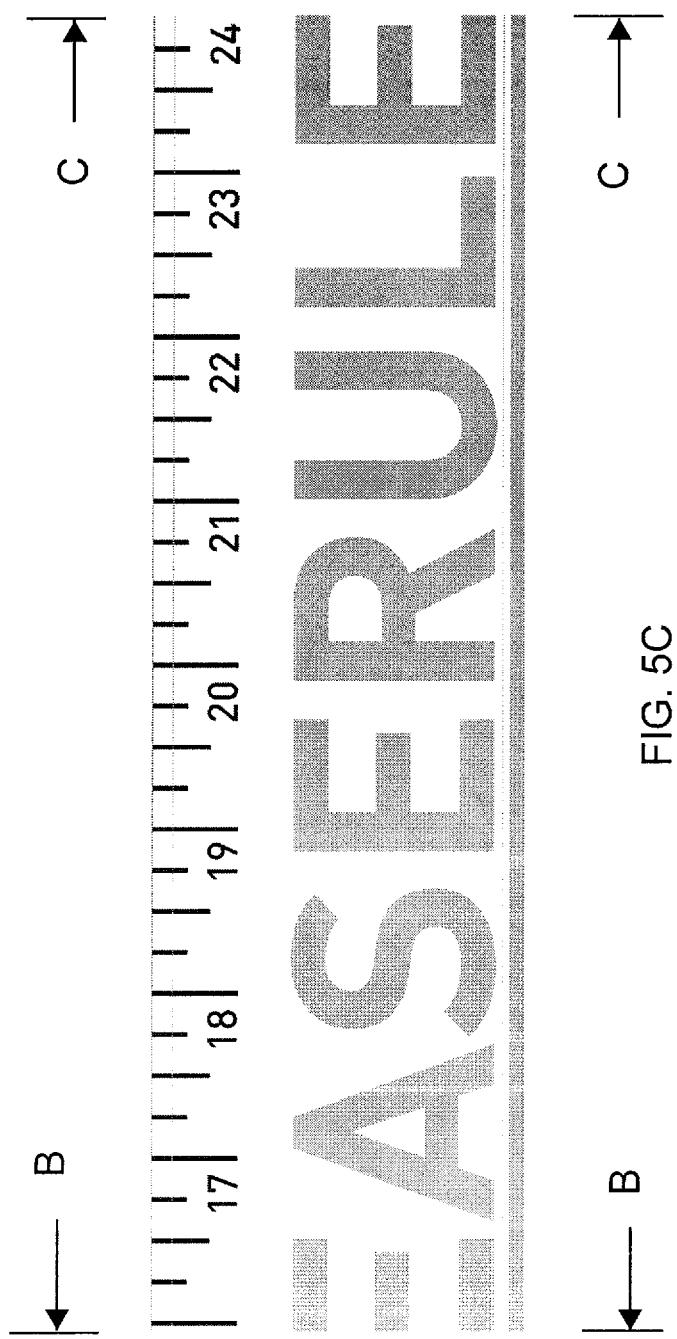
Figure 5D:
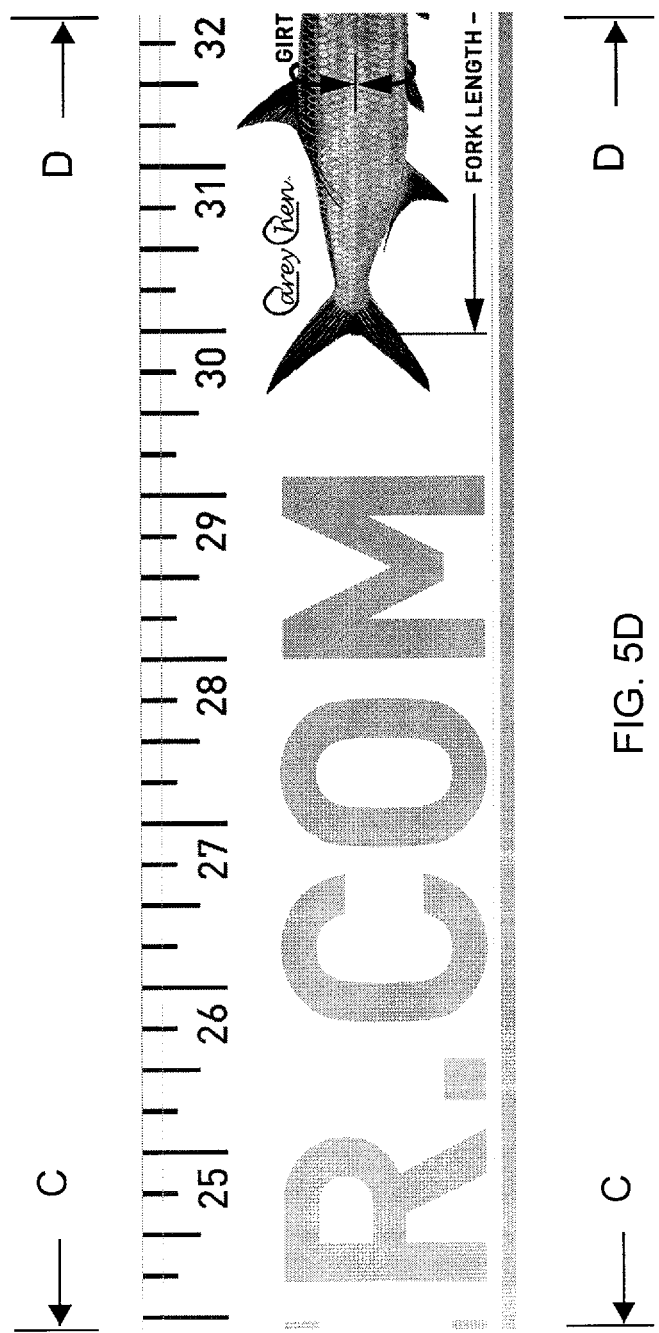
Figure 5E:
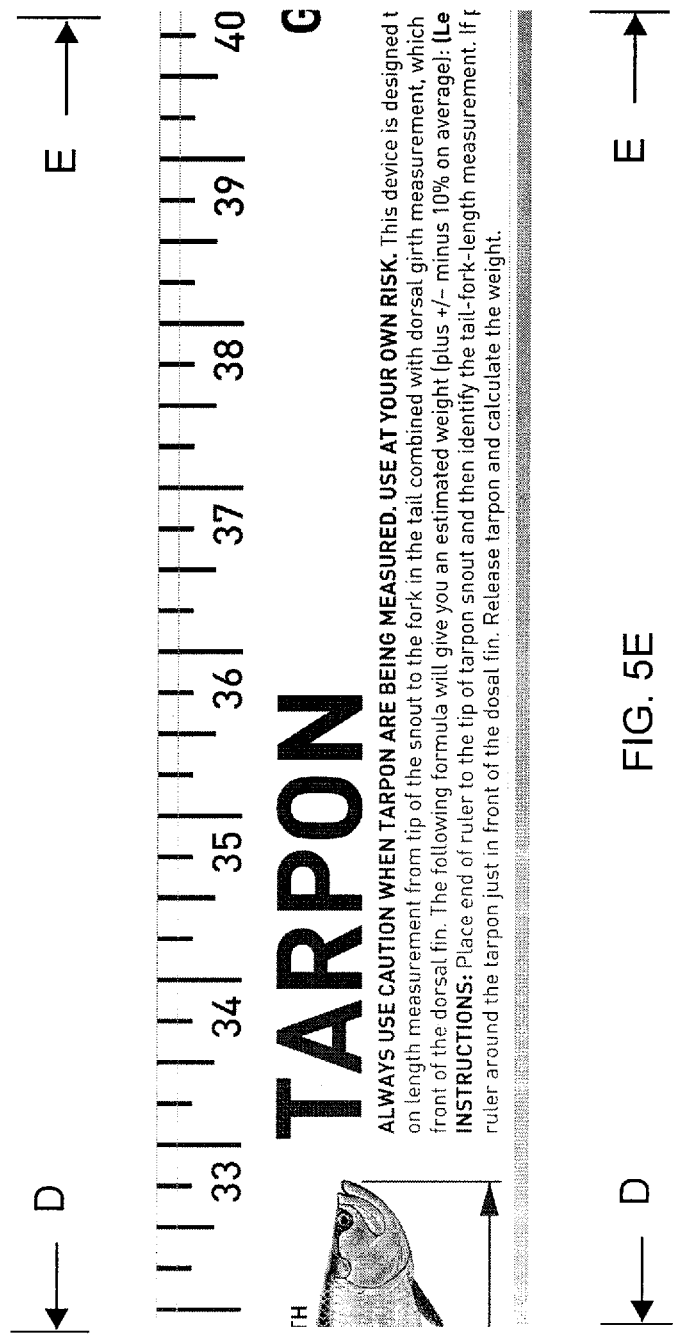
Figure 5F:
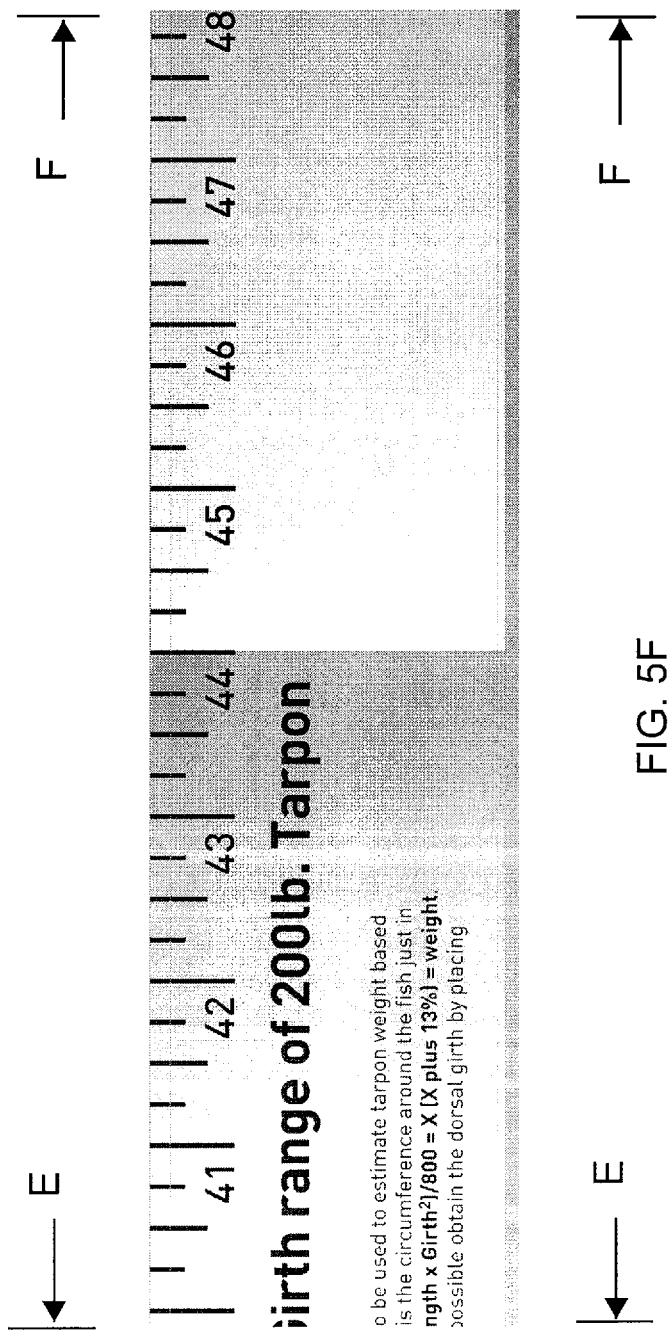
Figure 5H:
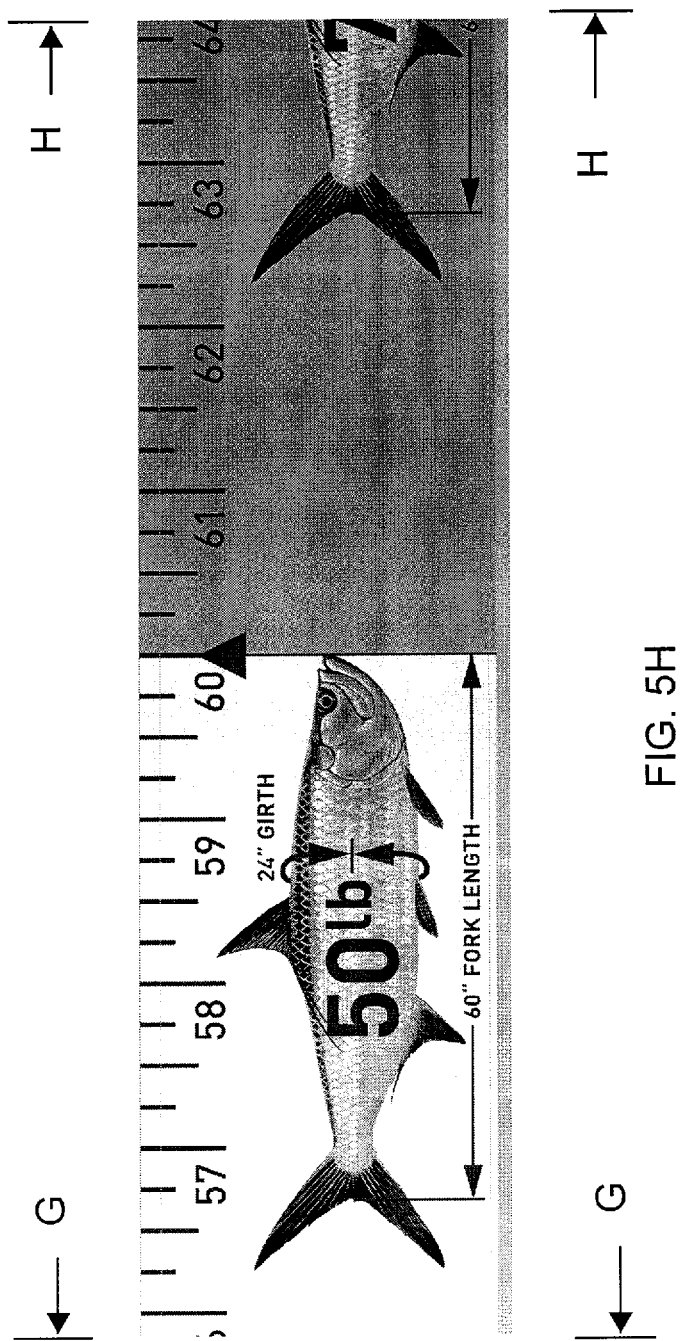
Figure 5I:
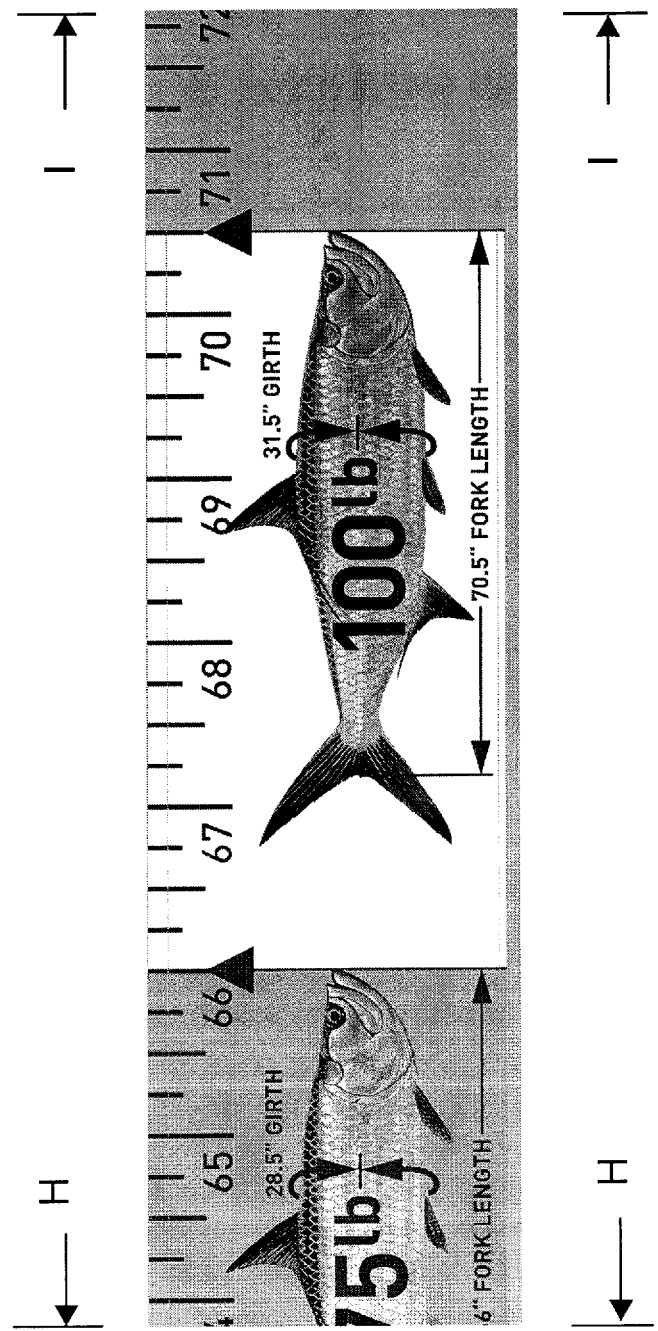
Figure 5J:
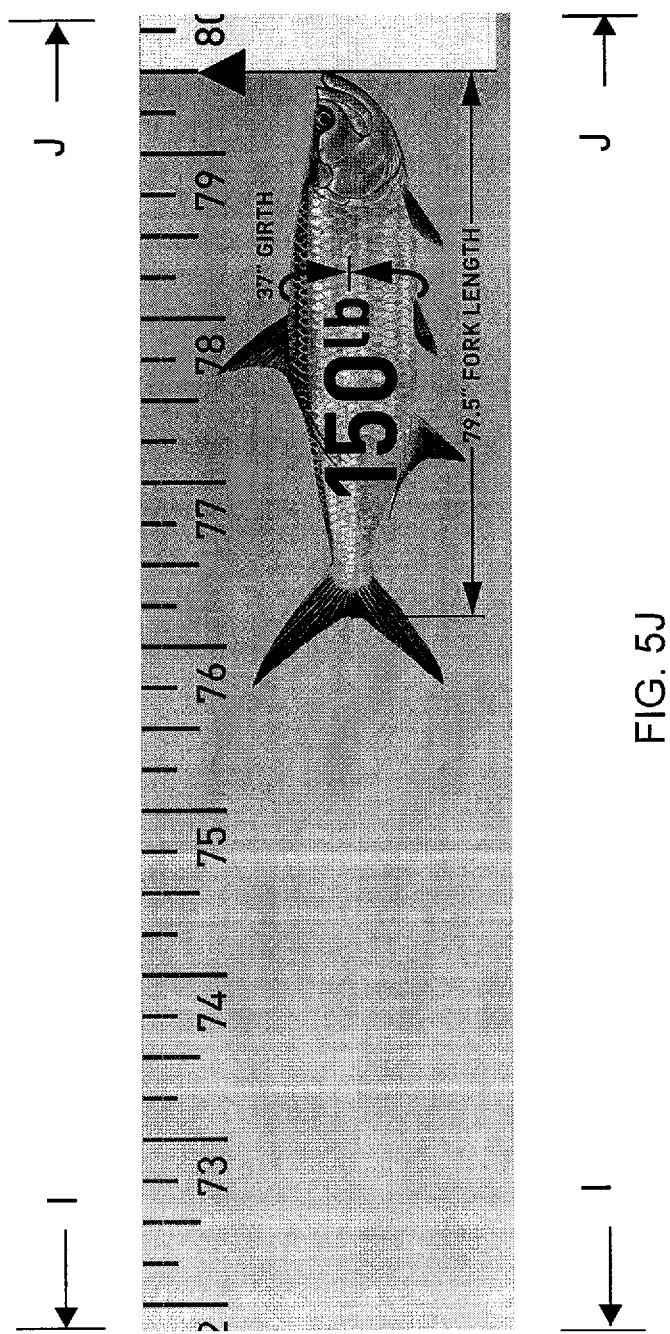
Figure 5K:
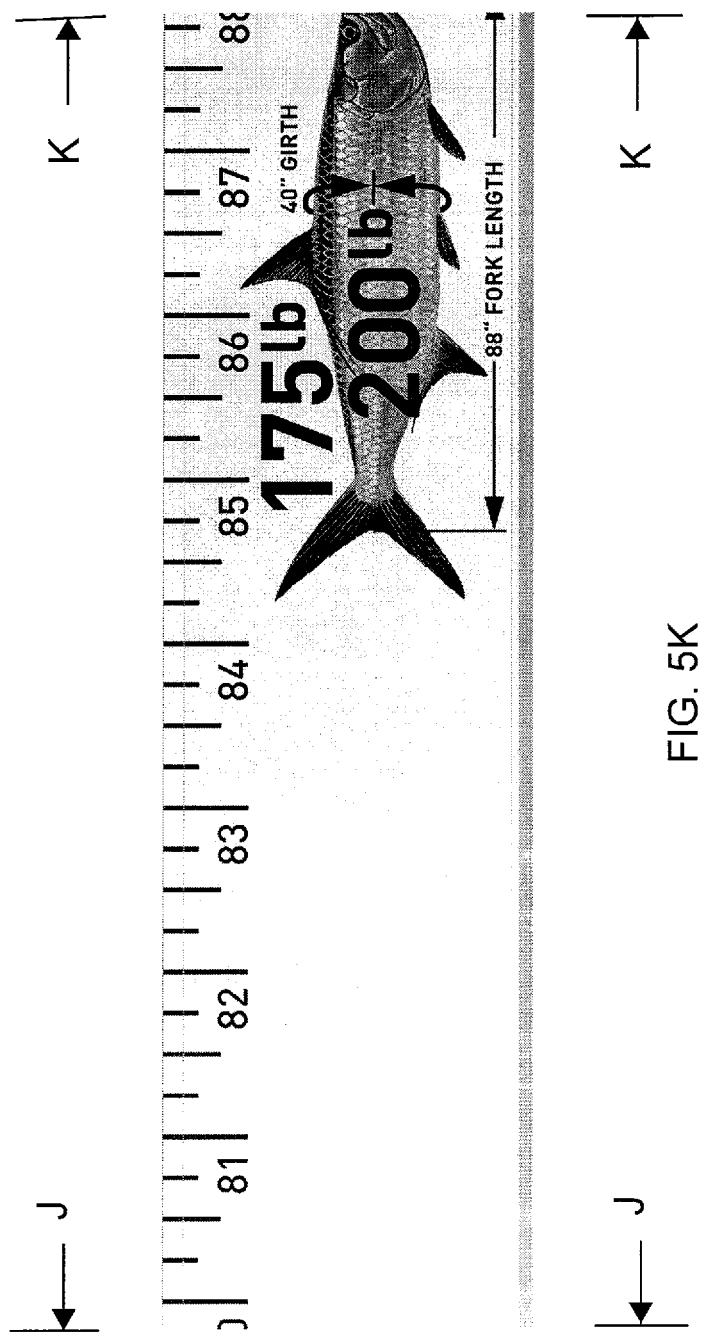
Figure 5L:
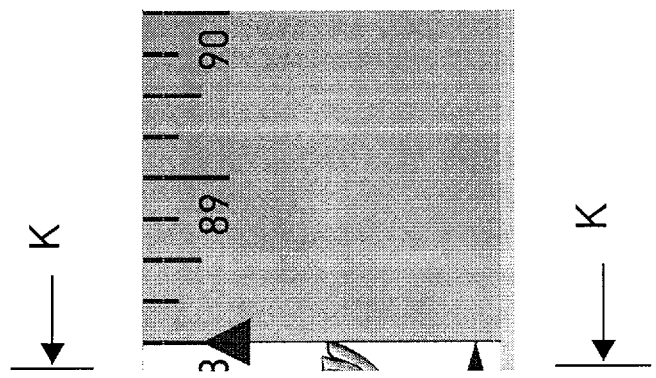
Figure 6A:
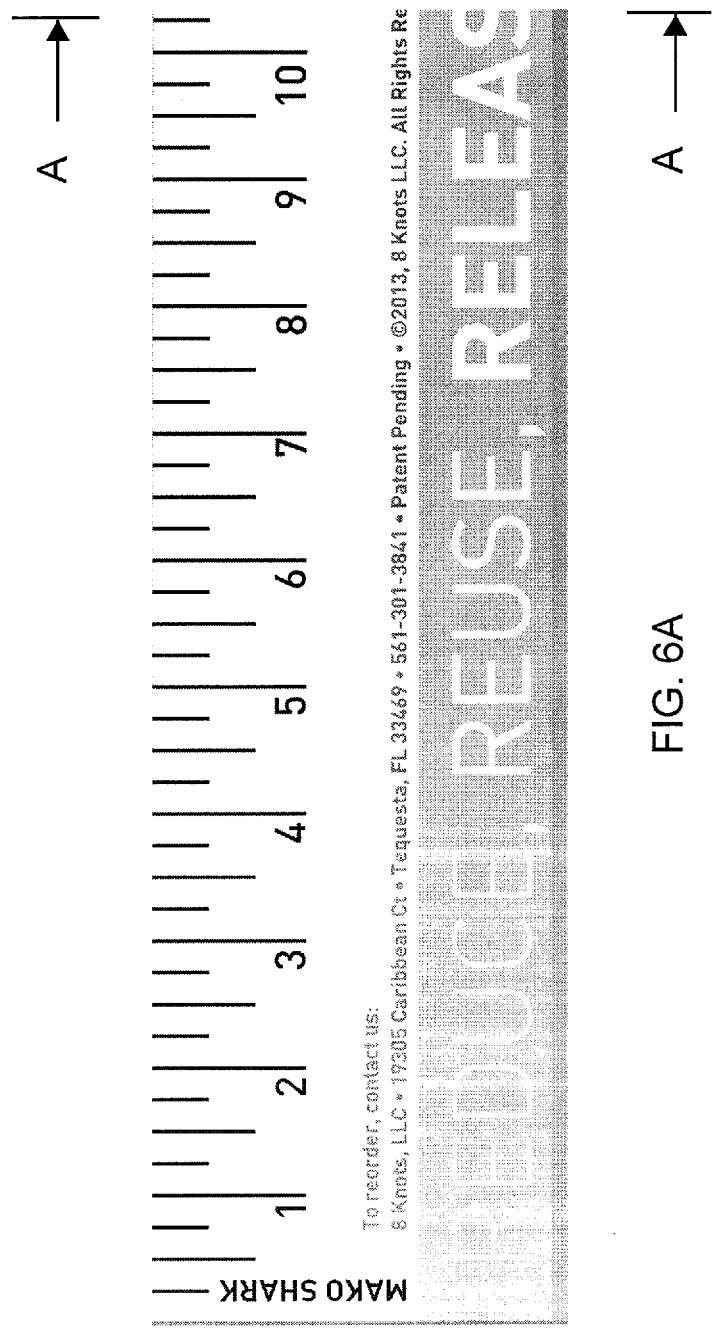
FIGS. 6A, 6B, 6C, 6D, 6E, 6F, 6G, 6H, 6I, 6J, 6K, 6L, and 6M are side views of a mako shark ribbon tape.
Figure 6B:
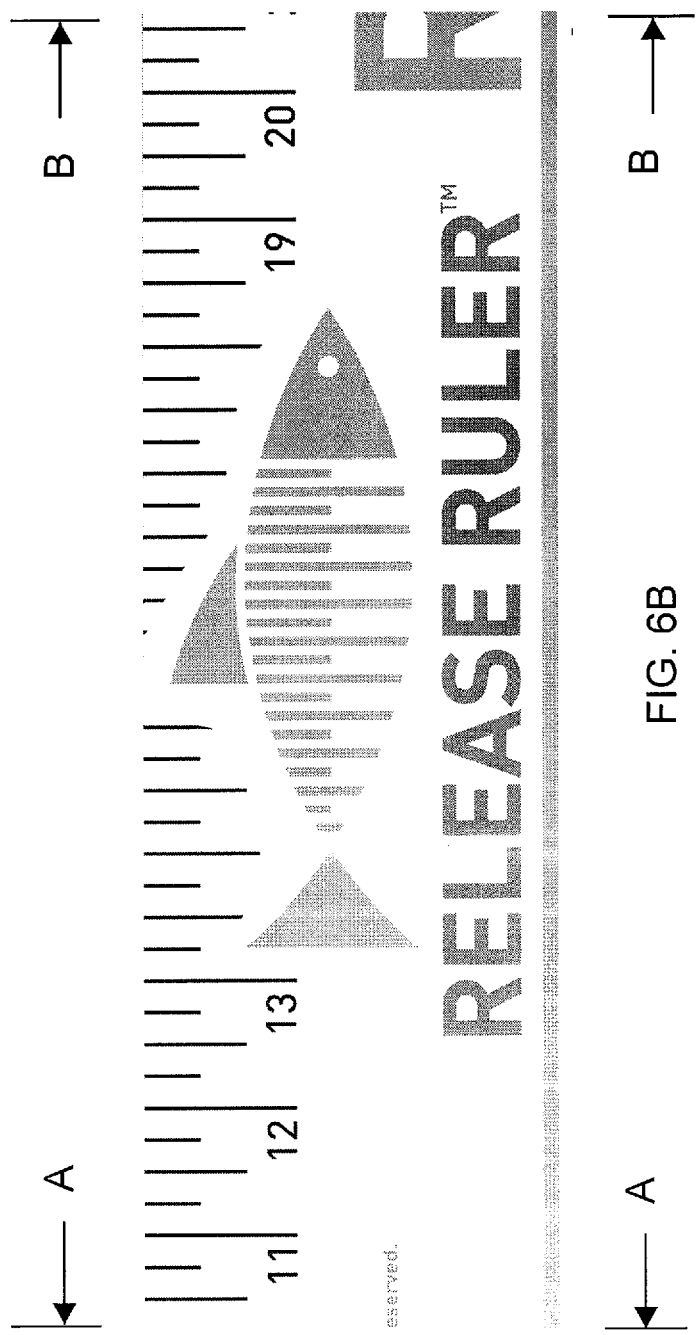
Figure 6C:
Figure 6D:
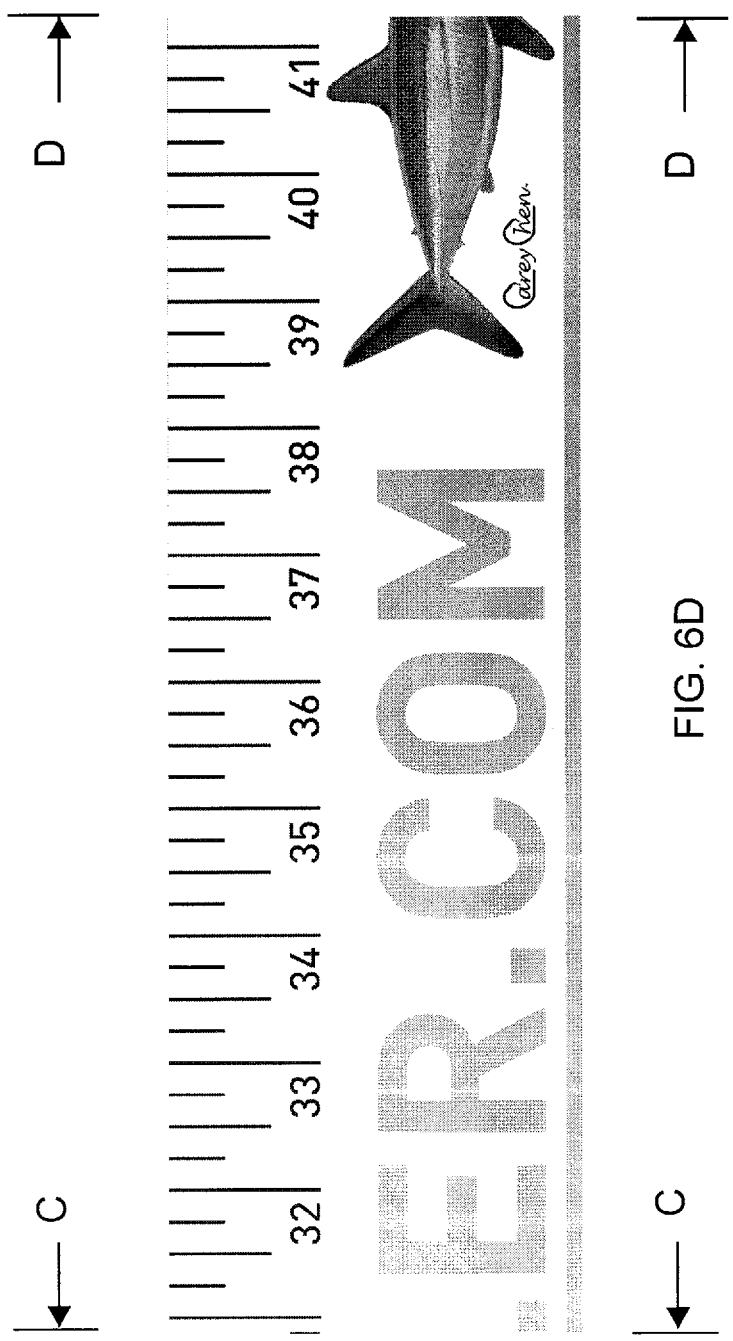
Figure 6E:
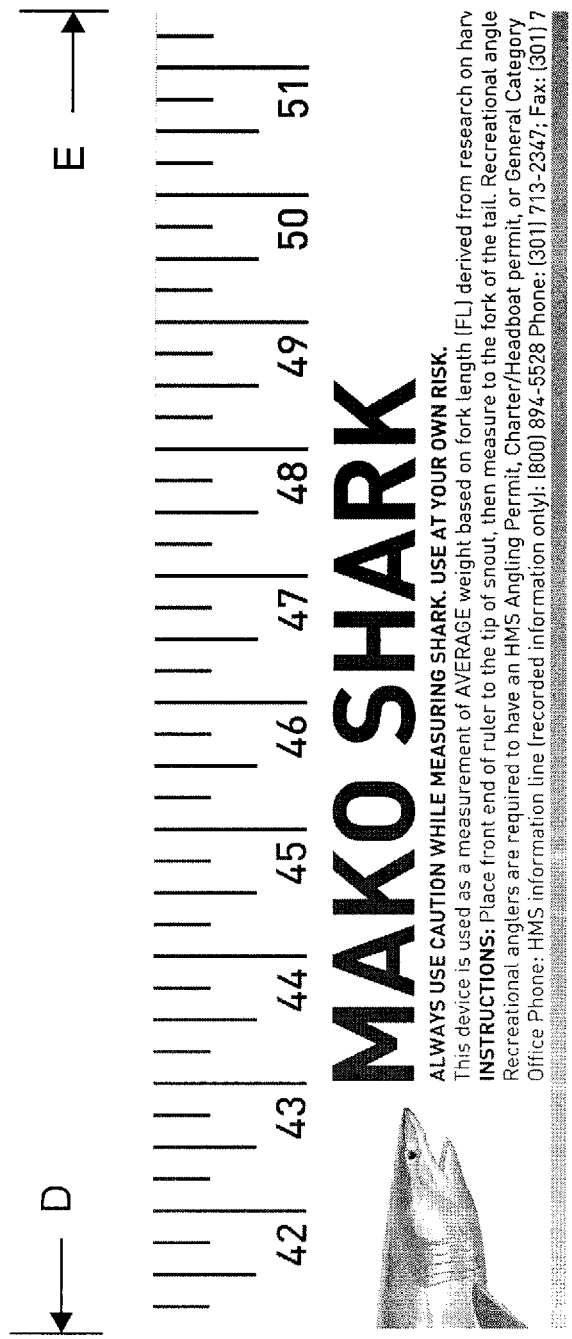
Figure 6F:
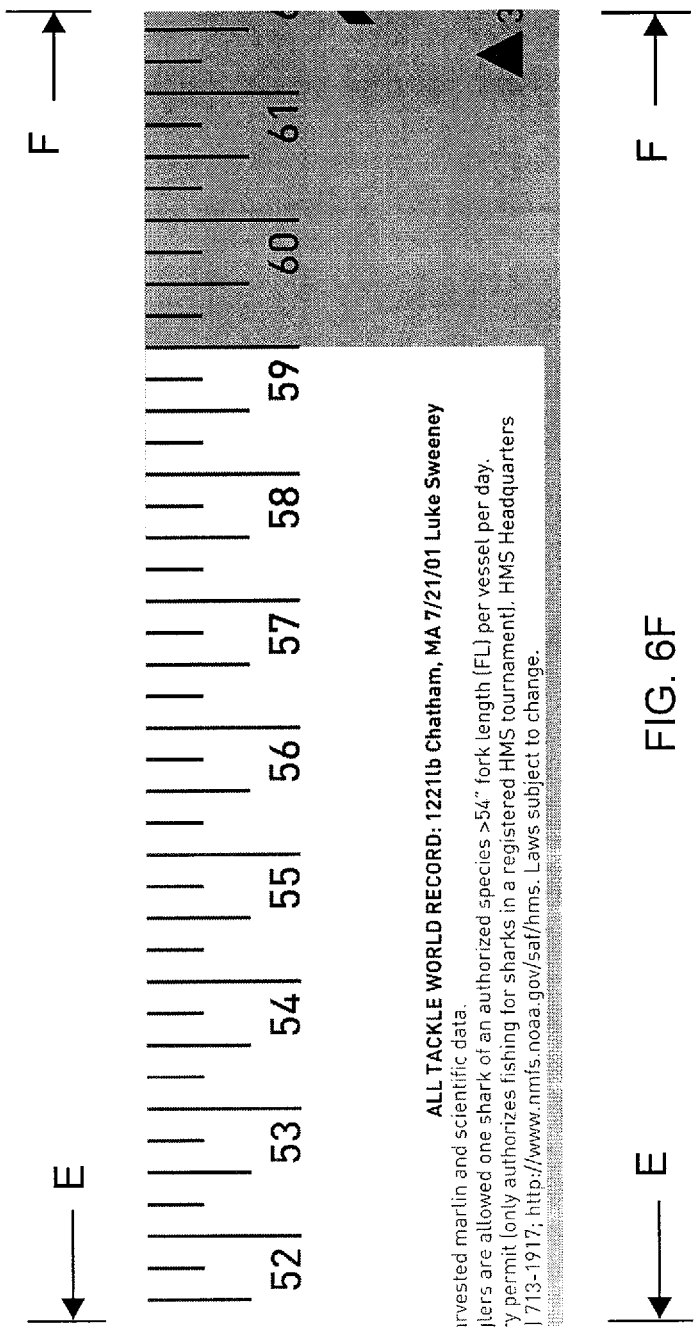
Figure 6G:
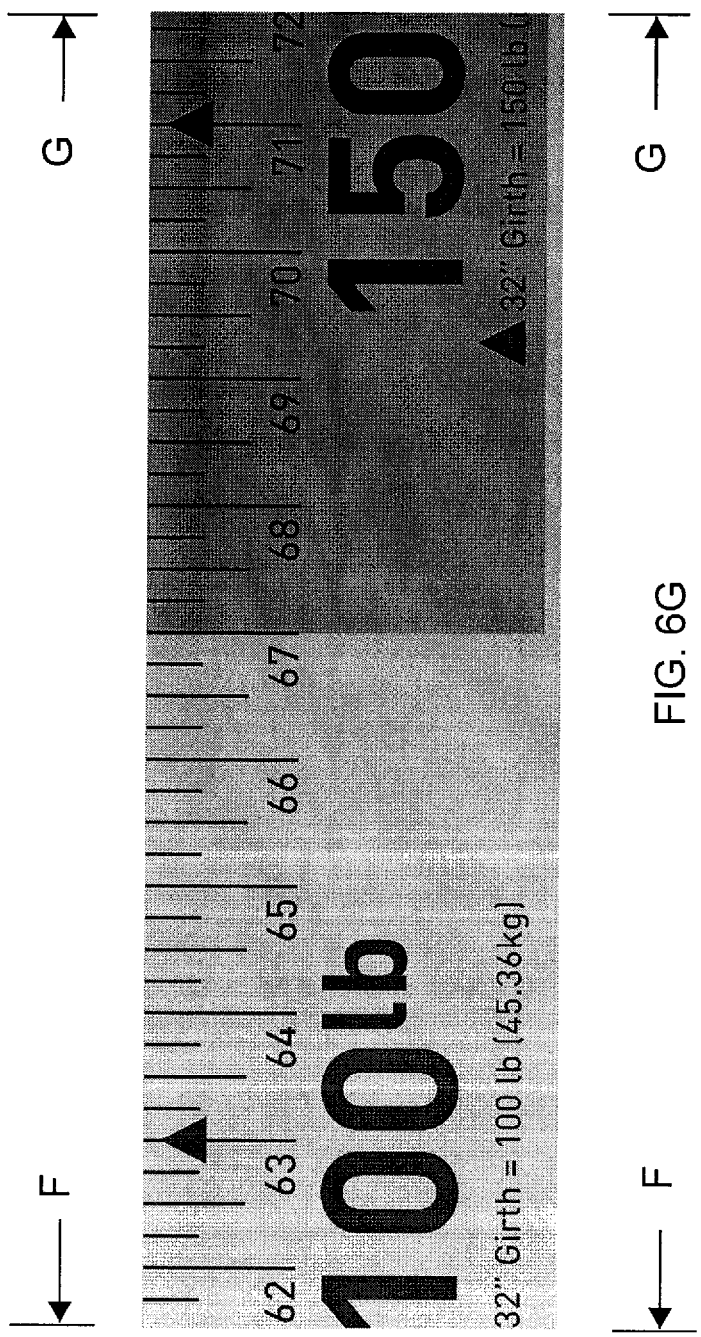
Figure 6H:
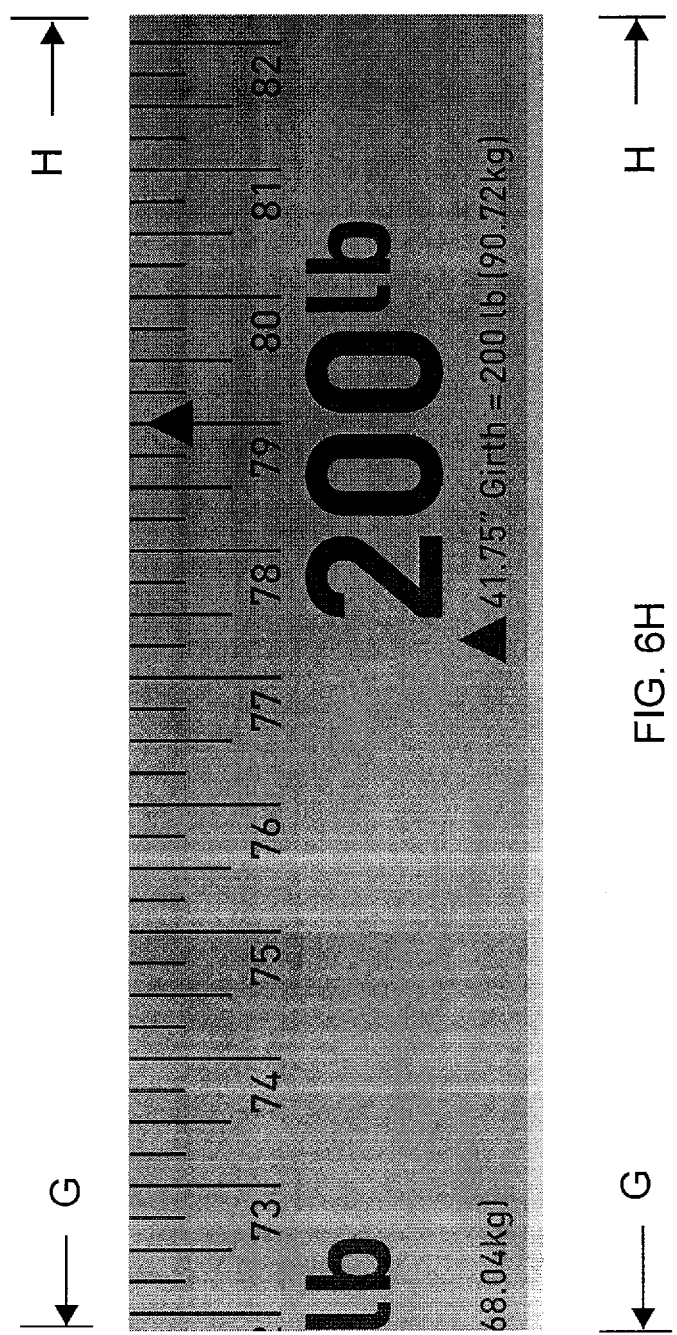
Figure 6I:
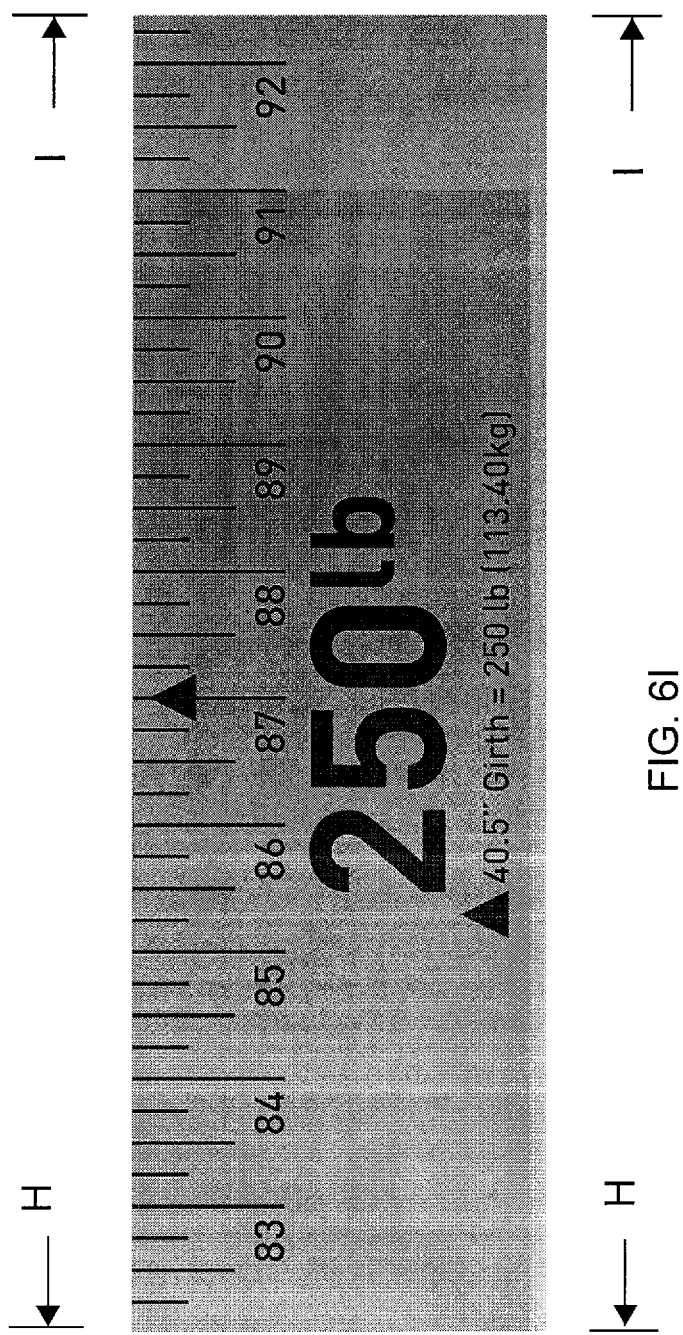
Figure 6J:
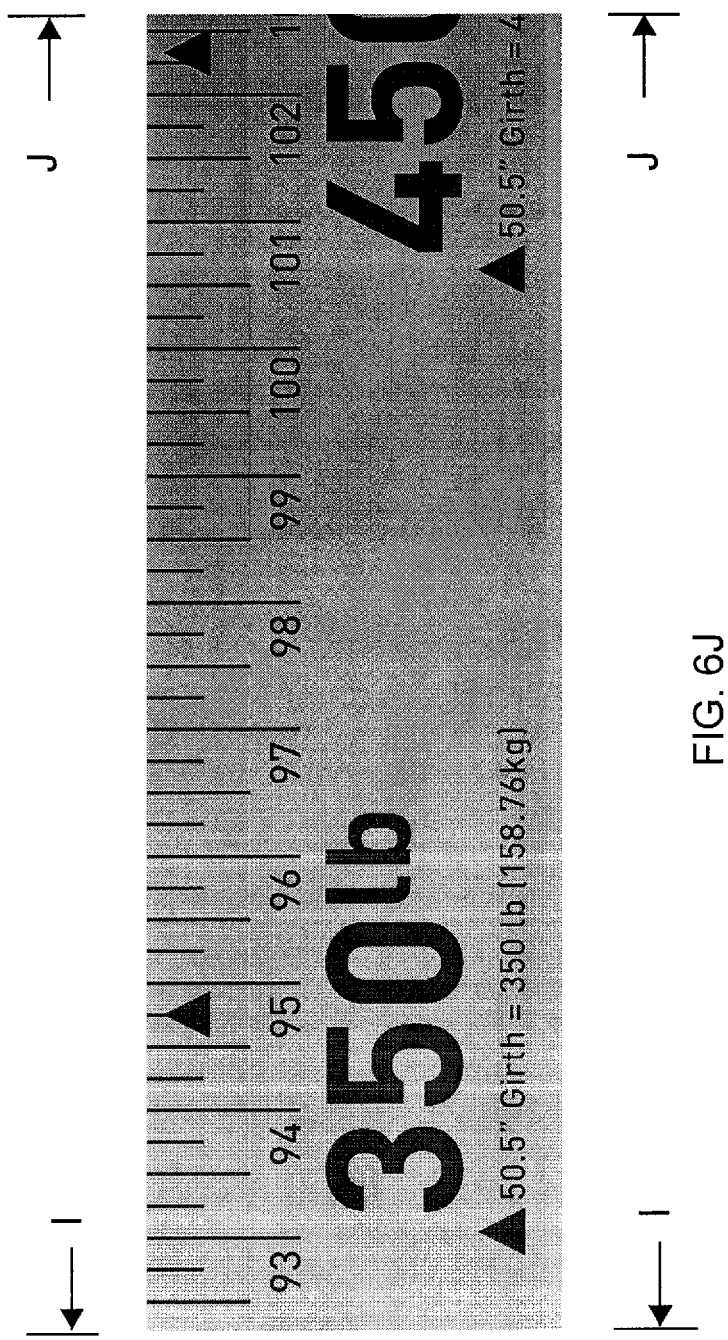
Figure 6K:
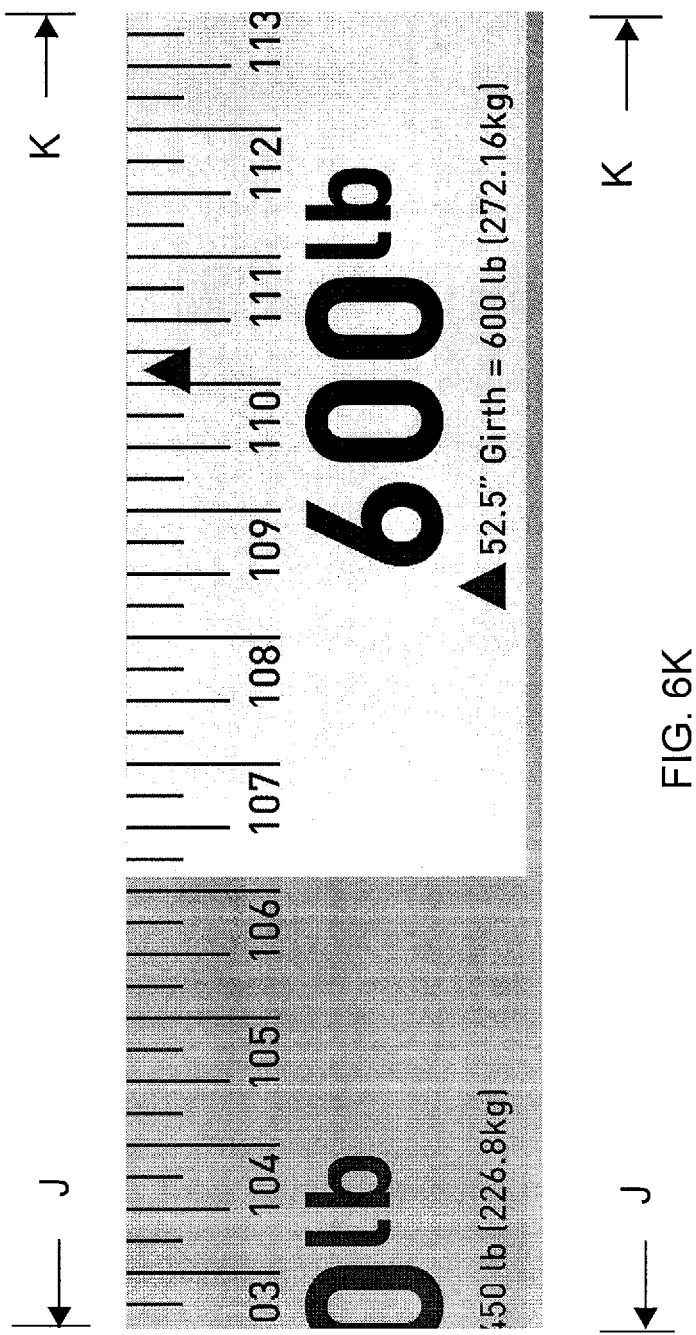
Figure 6L:
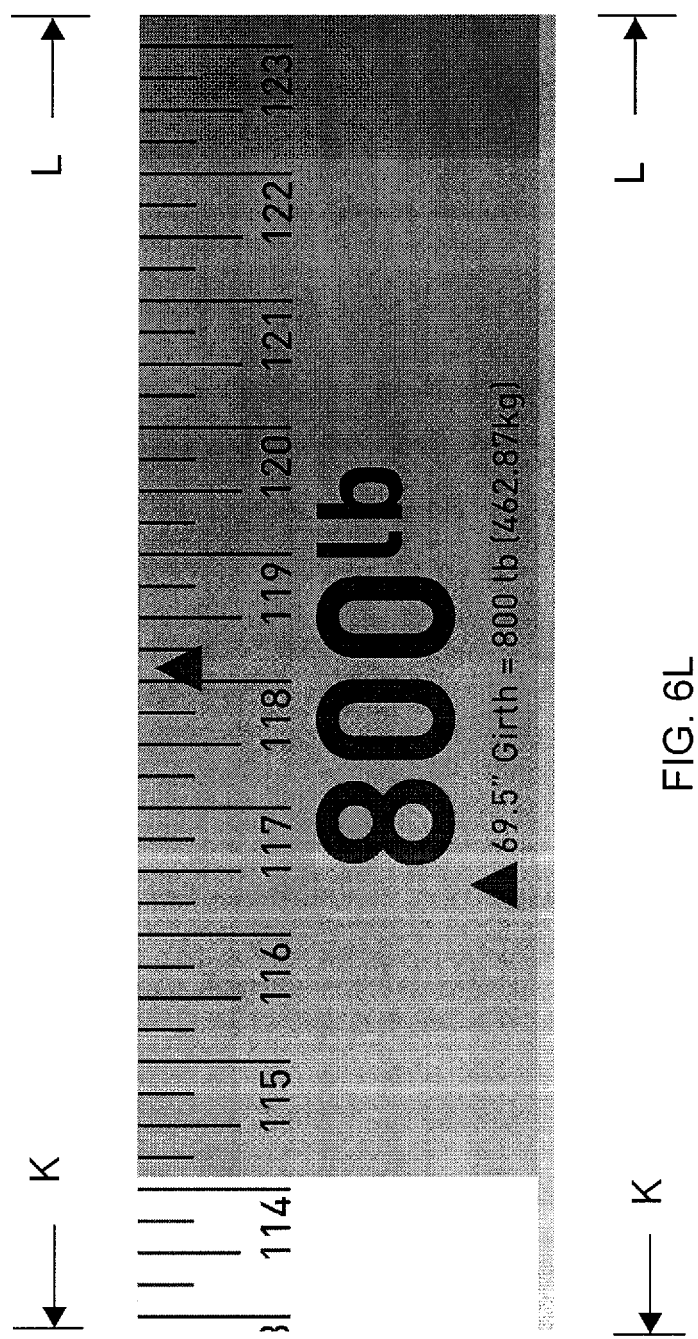
Figure 6M:
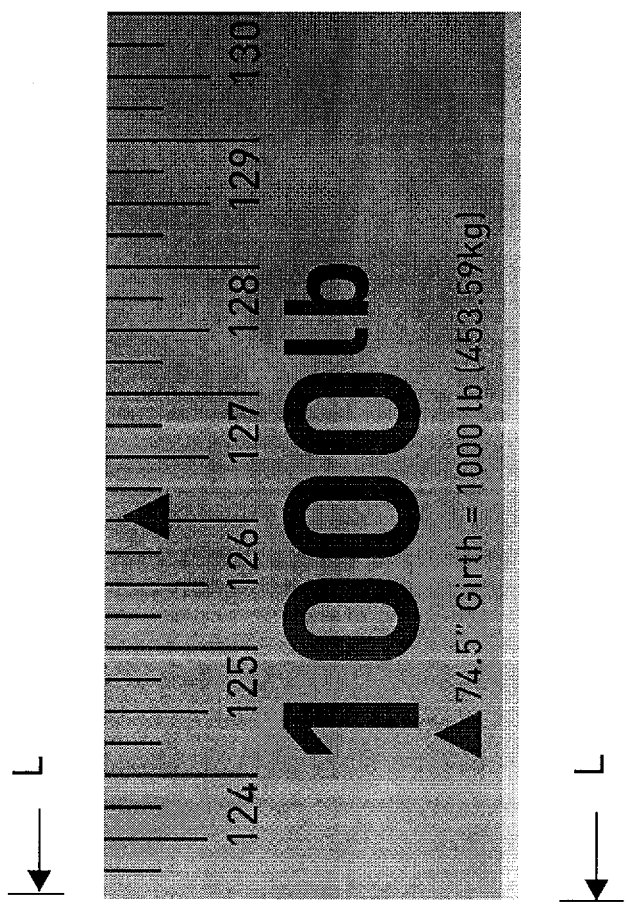

FIG. 2 shows the ribbon tape 20 having sequential graduation markings 24 along the length of the tape for measuring. The tape has a proximal end 26 where the graduation markings begin and a distal end 28 where the graduation markings end. As shown in FIG. 3 the tape is broken into sections which can be color coded for easy identification. The sections in FIG. 3 are depicted corresponding to the weight of blue marlins as a way of example, but the instant invention is not limited to use in conjunction with the blue marlin. Between 70 and 86¼ inches the ribbon tape is color coded for 100 pounds (45.36 kilograms). Between 86¼ and 97½ inches the ribbon tape is color coded for 200 pounds (90.72 kilograms). Between 97½ and 106 inches the ribbon tape is color coded 300 pounds (136.08 kilograms). Between 106 and 113½ inches the ribbon tape is color coded 400 pounds (181.44 kilograms). Between 113½ inches and 120½ inches the ribbon tape is color coded 500 pounds (22.6.8 kilograms). Between 120½ and 125½ inches the ribbon tape is color coded 600 pounds (272.16 kilograms). Between 125½ and 130½ inches the ribbon tape is color coded 700 pounds (317.5 kilograms). Between 130½ and 135 inches the ribbon tape is color coded 800 pounds (362.87 kilograms). Between 135 inches and 139 inches the ribbon tape is color coded 900 pounds (408.23 kilograms) and the ribbon tape is color coded between 139 and 150 inches for 1000 pounds (453.59 kilograms).

The tape is flexible and can be rolled into a compact bundle for the purposes of storage and easily unrolled for use as the floating ribbon tape. It should be noted that the ribbon tape can be used for most any type of fish when the scale and weight has been adjusted to the particular species, as seen in the examples provided in FIGS. 4-6. For those fish lacking a bill, the frontal aperture 22 could be placed around a fishing line or pole and placed along the edge of the fish mouth extending to the fork of the fishes tail, again to provide an approximate weight and length without stressing or providing further harm to the fish.

Figure 7:
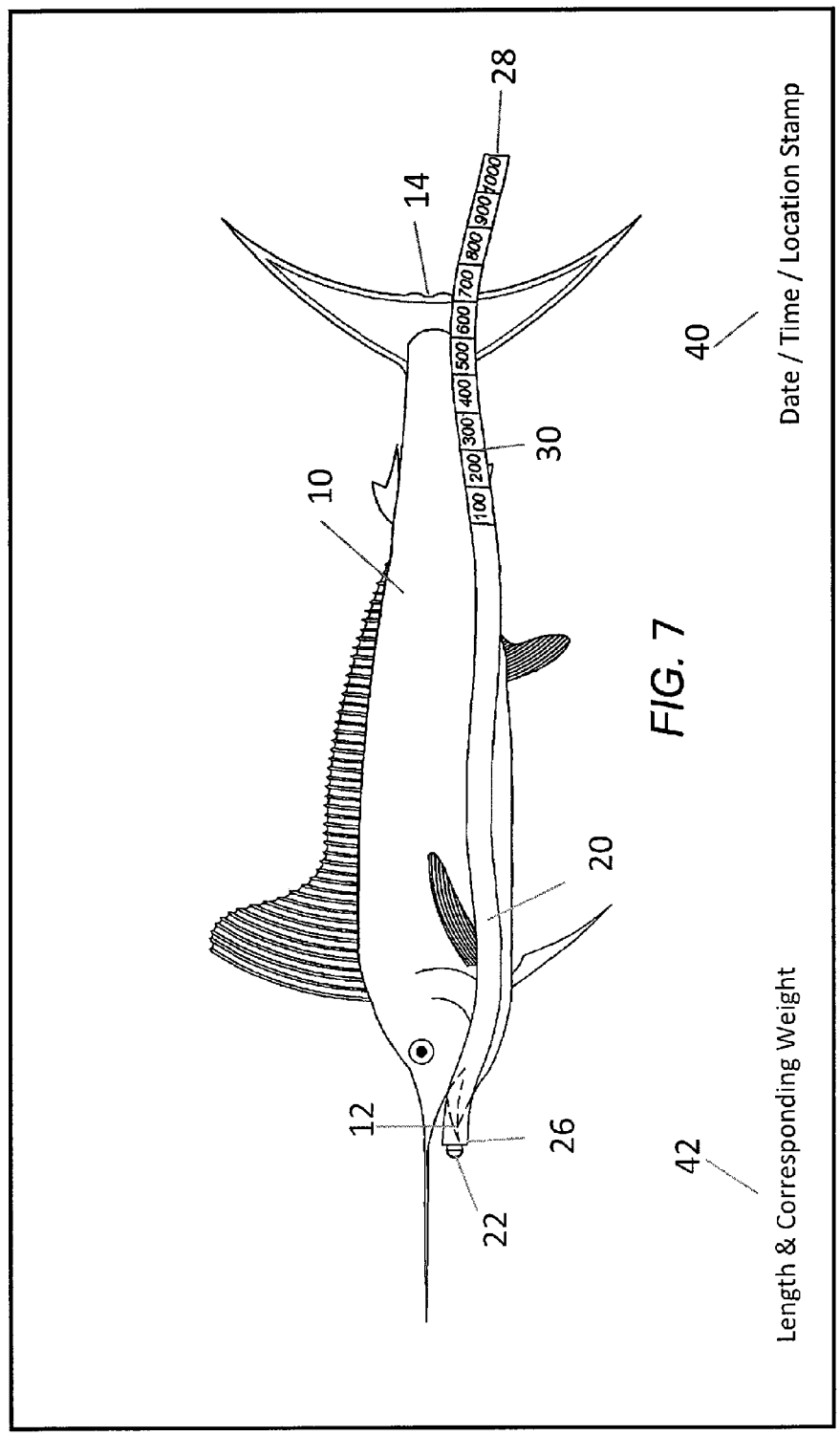
FIG. 7 is a pictorial view of a fish with a ribbon tape as documented in a still image by the camera of a GPS enabled smart-phone.

In FIG. 7 we can see representation of the documentation of a catch in a camera application on a GPS-enabled smart-phone. Here, as the ribbon tape 20 is laid next to the fish 10 with frontal aperture 22 next to the beak 12 of the fish, the camera can document the length as the ribbon tape 20 extends back to the tail fork 14, spanning the length of the fish allowing for calculation of the weight. The date, time, and location stamp 40 and the length with corresponding weight 42, based on the GPS information the smart-phone receives from the GPS network, will enable this screen shot to accurately depict the date, time, location, length, and corresponding weight of the catch for competition purposes or for the personal documentation of a recreational angler. In a further embodiment including a smart-phone application, as long as the ribbon tape 20, or any object having a known length, is near the fish 10, the ribbon tape 20, or object having a known length, can be used to mark a reference length by marking the two known points along the ribbon tape 20, such as the frontal aperture 22 and another known point 30 along the length of the ribbon tape, or by marking the start and end of the object having a known length. Then the beak 12 and tail fork 14 can be marked and the application can calculate the length and weight of the fish 10 by comparing the reference length to the length between the beak and tail fork 14 of the fish 10. This information can be calculated and depicted on the image to document the date, time, and location 40 and the length and corresponding weight of the catch. The image documenting the catch with date, time, location, length, and weight can then be sent from the GPS-enabled smart-phone to a tournament weigh-in station so that the boat does not need to create a safety hazard by racing to meet any cut-off time requirements of the tournament and the catch can be submitted while the boat comes back safely.

Figure 8:
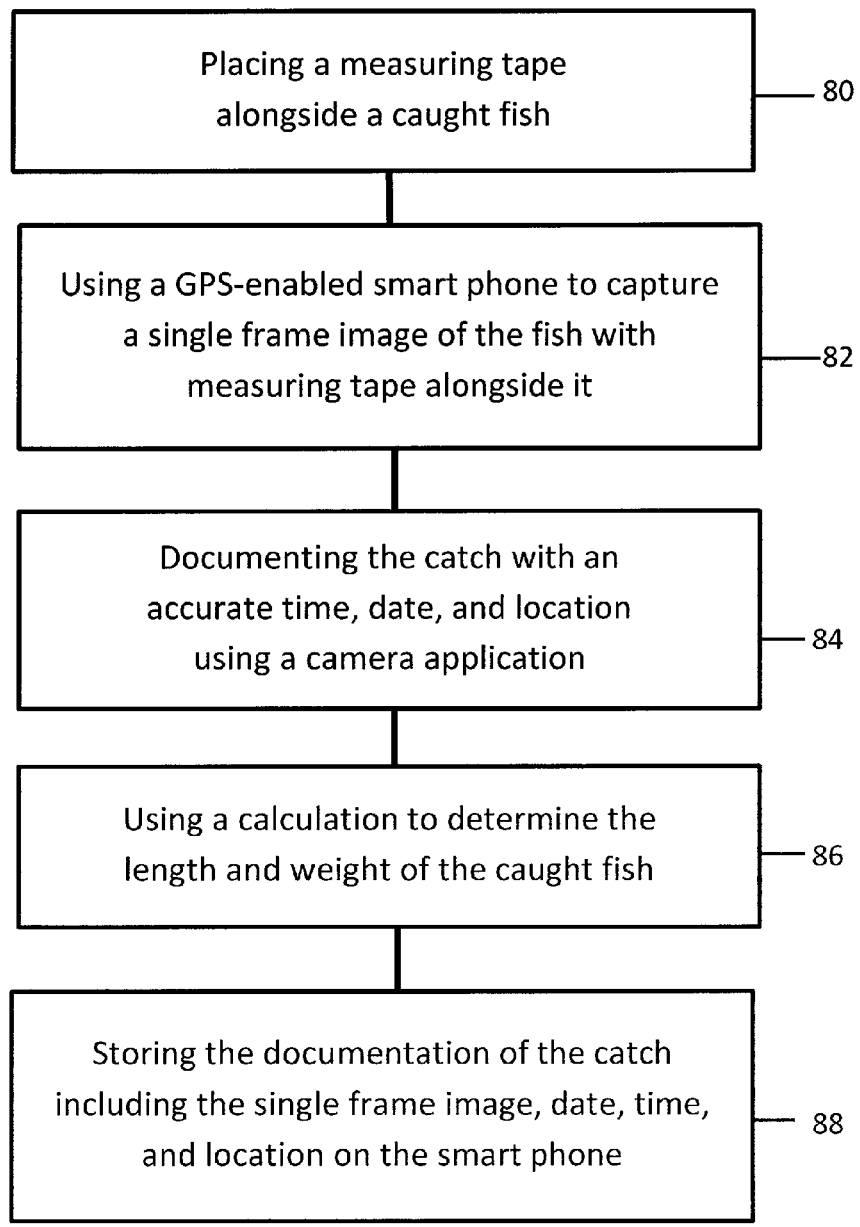
FIG. 8 is a flowchart of the method of the instant invention for measuring the weight of a fish.

In FIG. 8 we see the method used to measure and document the weight of a caught fish without coming to shore. An angler with a fish caught and brought alongside the boat will place the ribbon tape alongside the fish 80, then, using a GPS-enabled smart-phone capture a single frame image of the fish with the ribbon tape alongside it 82. It should be noted here that the single frame image can again come from a still photographic image or a single frame from a video. As the phone captures the image, the image will be tagged by a camera application with an accurate date, time, and location based on GPS information received by the smart-phone from the GPS network 84. Using a calculation the smart-phone can determine the length and weight from of the caught fish 86. Then the smart-phone stores the image of the catch with along with the accurate time, date, location, length, and weight information 88 which can then be used for competition purposes or for personal achievement records.

In a further embodiment the ribbon tape and application can be adapted to measure characteristics of other trophy animals. By way of example, for trophy animals with antlers, the single frame image of the animal's antlers can be marked by the user so that the lengths of the spread and lengths of the points can be calculated to determine the antler's score. Alternatively with an animal such as an alligator, the head length and width can be used determined by a proportional calculation which can then be used to estimate the overall size of the alligator so that a hunter can determine whether to kill or release the alligator. Other animals size can be estimated by using an image to determine height, width, length, or other dimensional characteristics.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A system of determining and documenting the size of a fish comprising of:
   a ribbon positionable alongside the fish, said ribbon having a proximal end and a distal end and a plurality of sequential linear graduation markings therealong specific to units of length to allow visual indication of the length of the fish, said units of length corresponds to a group of said graduation markings corresponding to a weight of the fish;
   a smart-phone used in combination with said ribbon, said smart-phone equipped with a camera for capturing the image of the fish and ribbon placed alongside and an application for receipt of a GPS signal for inserting a UTC time from the GPS signal into the image;
   wherein the smart-phone user can capture an image of the fish together with the UTC time the image was taken whereby the length of the fish is determined by reviewing the markings on the ribbon and the weight of the fish is determined by reviewing a group of graduation markings on the ribbon.

2. The system of claim 1, includes a camera application running on a microprocessor on said smart-phone, said camera application determines a fish weight using said fish length based off said single frame image using a proportionality calculation and thereafter calculating a corresponding weight of said fish.

3. The system of claim 2, wherein a user can demarcate a known starting and ending length of said fish, thereby allowing said camera application to calculate said length based off said demarcated starting and ending length, and thereafter calculate said corresponding weight of said fish.

4. The system of claim 2, wherein said camera application documents, records, and displays said date, said GPS Time or said Coordinated Universal Time (UTC), and said GPS location.

5. The system of claim 1, wherein said smart-phone allows a user to upload said image to internet based website.

6. The system of claim 1, wherein said image is a video.

7. The system of claim 1, wherein said ribbon tape is a measuring tape constructed from PVC coated vinyl.

8. The system of claim 1, wherein said ribbon includes a D-ring coupled to said proximal end for receipt of a pole tip allowing said ribbon to be aligned alongside the fish while the fish next to a vessel.

9. A method for documenting and determining the size of a fish comprising of the steps of:
   placing a ribbon having a proximal end, distal end, and a plurality of sequential linear graduation markings therealong, alongside the fish;
   engaging a smart-phone having a GPS receiver and a camera to take a image of said ribbon alongside the fish;
   automatically documenting said image with a GPS Coordinated Universal Time;
   storing said image and said date; and
   transferring said stored image and said date to a remote location.

10. The method of claim 9, wherein said camera includes an algorithm to determine the fish weight based off a fish length.

11. The method of claim 10, wherein said image is selected from a still frame of a video.

12. The method of claim 11 including the step of depicting a known starting point and ending point of said length of said fish, thereby allowing said application to calculate said length based off said demarcated starting and ending length and corresponding said weight of the fish.

13. The method of claim 11, including the step of incorporating a GPS location on said image.

14. The method of claim 11, including the step of forwarding said image to an internet based website.

15. A method for documenting and determining the weight of a fish comprising of the steps of:
   placing an object of known length, having a proximal end and a distal end alongside a fish when caught;
   using a smart-phone having a GPS receiver electrically coupled to a GPS network, a camera electrically coupled to said smart-phone, and a camera application running on a microprocessor on said smart-phone, to take a single frame image of said measuring tape alongside a fish;
   demarcating a known starting point and ending point of a length of said fish, thereby allowing said application to calculate said length based off said demarcated starting and ending length and corresponding said weight of said fish;
   documenting said single frame image with an accurate and reliable date, GPS Time, Coordinated Universal Time (UTC), GPS location, and local time based on a GPS location of said smart-phone;
   allowing said camera application to perform a to perform a proportional calculation to determine the length and corresponding weight of the fish;
   storing said date, said GPS Time, said Coordinated Universal Time (UTC), said GPS location, said local time, said fish length, and said fish weight onto said smart-phone.

16. The method of claim 11, wherein said camera application uses an algorithm to determine said fish weight based off a fish length.

17. The method of claim 11, wherein said fish length is determined by said camera application.

18. The method of claim 11, wherein said camera application documents, records, and displays said date, said GPS Time or said Coordinated Universal Time (UTC), said GPS location, said local time, said fish weight, and said fish length based off said single frame image.

19. The method of claim 11, wherein said smart-phone allows said GPS Time, said Coordinated Universal Time (UTC), said GPS location, said local time, said fish weight, and said fish length to be uploaded via wireless internet connection.

\* \* \* \* \*